United States Patent
Fujimura et al.

(10) Patent No.: US 10,185,104 B2
(45) Date of Patent: Jan. 22, 2019

(54) OPTICAL RECEIVER AND METHOD OF ASSEMBLING THE SAME AND PROVIDING ROTATIONAL ALIGNMENT

(71) Applicant: Sumitomo Electric Industries, Ltd., Osaka-shi (JP)

(72) Inventors: Yasushi Fujimura, Yokohama (JP); Munetaka Kurokawa, Yokohama (JP); Tomoya Saeki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/779,135

(22) PCT Filed: Nov. 25, 2016

(86) PCT No.: PCT/JP2016/004970
§ 371 (c)(1),
(2) Date: May 25, 2018

(87) PCT Pub. No.: WO2017/090255
PCT Pub. Date: Jun. 1, 2017

(65) Prior Publication Data
US 2018/0356607 A1    Dec. 13, 2018

(30) Foreign Application Priority Data

Nov. 27, 2015 (JP) .................. 2015-232076
Nov. 27, 2015 (JP) .................. 2015-232138
(Continued)

(51) Int. Cl.
*G02B 6/42* (2006.01)
*H04B 10/61* (2013.01)

(52) U.S. Cl.
CPC ......... *G02B 6/4227* (2013.01); *G02B 6/4206* (2013.01); *G02B 6/4225* (2013.01); *H04B 10/614* (2013.01); *H04B 10/615* (2013.01)

(58) Field of Classification Search
CPC .. G02B 6/4227; G02B 6/4206; G02B 6/4225; H04B 10/614; H04B 10/615
See application file for complete search history.

(56) References Cited

U.S. PATENT DOCUMENTS 8,805,188 B2*  8/2014  Kikuchi ............... H04B 10/532
                                                             398/152
8,855,502 B2* 10/2014  Mikami ............... H04B 10/613
                                                             398/205
(Continued)

*Primary Examiner* — Andrew Jordan
(74) *Attorney, Agent, or Firm* — Venable LLP; Michael A. Sartori; Miguel A. Lopez

(57) ABSTRACT

A method of assembling an optical module that recovers data by interfering signal light with local light is disclosed. The optical module provides a housing with a side to which a signal port and a local port are fixed, and an optical components having a light incident surface whose normal makes an angle θ except for 0° and 90° against the axis of the signal port. The method first adjusts a rotation of the assembling apparatus by (1) setting a tool on the apparatus, where the tool has a pair of sides parallel to each other and a reference side making the angle θ against one of the paired sides, and (2) facing the reference side toward the preset direction. Next, setting the housing on the apparatus in an attitude same with the tool and facing the optical component toward the preset direction above the housing, the process installs the optical component within the housing.

9 Claims, 20 Drawing Sheets

(30) Foreign Application Priority Data

Jan. 13, 2016 (JP) .................................. 2016-004615
Jan. 27, 2016 (JP) .................................. 2016-013528

(56) References Cited

U.S. PATENT DOCUMENTS

| | | | |
|---|---|---|---|
| 9,048,956 B2* | 6/2015 | Suzuki | H04B 10/612 |
| 9,461,754 B2* | 10/2016 | Sonoda | H04B 10/07955 |
| 9,608,736 B2* | 3/2017 | Watanabe | G02B 6/4215 |
| 9,831,956 B2* | 11/2017 | Yasuda | H04B 10/613 |
| 9,989,755 B2* | 6/2018 | Fujimura | G02B 6/4225 |
| 10,033,468 B2* | 7/2018 | Suzuki | H04B 10/612 |
| 2012/0008951 A1* | 1/2012 | Mikami | H04B 10/613 398/65 |
| 2012/0069854 A1* | 3/2012 | Suzuki | H04B 10/611 370/465 |
| 2012/0134676 A1* | 5/2012 | Kikuchi | H04B 10/532 398/65 |
| 2013/0236172 A1* | 9/2013 | Suzuki | H04B 10/612 398/43 |
| 2014/0212137 A1* | 7/2014 | Watanabe | G02B 6/4215 398/65 |
| 2015/0117865 A1* | 4/2015 | Sonoda | H04B 10/07955 398/140 |
| 2015/0249507 A1* | 9/2015 | Suzuki | H04B 10/612 398/34 |
| 2015/0372765 A1* | 12/2015 | Yasuda | H04B 10/613 398/29 |
| 2017/0038541 A1* | 2/2017 | Fujimura | G02B 6/4225 |

* cited by examiner

OPTICAL RECEIVER AND METHOD OF ASSEMBLING THE SAME AND PROVIDING ROTATIONAL ALIGNMENT

TECHNICAL FIELD

The present invention relates to an optical receiver and a method of producing the same.

BACKGROUND ART

A United States Patent US-2015/117865A has disclosed an optical received implemented within a coherent optical communication system. FIG. 20 schematically illustrates an optical coupling system disclose in the prior patent document above described. The optical receiver 100 in FIG. 20 provides an optical substrate 101, two optical hybrids, 111 and 112, photo-detectors, 134 and 135, and a monitor photodiode (mPD) 104, where those devices are enclosed within a housing 105. Signal light L1 and local light L2 enter respective optical waveguides, 106 and 107, through an end 101a of the optical substrate 101.

A beam splitter (BS) 131 splits the signal light L1 into two parts, one of which enters the PD 104, while, another advances another BS 132 that splits the signal light L1 coming from the BS 131 also into two parts that enter respective optical hybrids, 111 and 112. On the other hand, the local light L2 is also split by still another optical splitter 133 to the respective optical hybrids, 111 and 112. Thus, the optical coupling system that optically couples the signal light L1 and the local light L2 with the optical hybrids, 111 and 112, provides the optical components, 131 to 133, with optical surfaces whose normals make angles against an optical axis of the signal light L1 and/or the local light L2 except for 0° and 90°. In order to enhance the coupling efficiency of the light, L1 and L2, with the optical hybrids, 111 and 112, the surfaces of the optical components, 131 and 132, exactly, the normals thereof are necessary to be precisely aligned with the optical axes of the light, L1 and L2, as keeping a preset angle different from 0° and 90°.

SUMMARY OF INVENTION

An aspect of the present invention relates to a method of assembling an optical module. The optical module provides housing, an input port, and an optical component. The housing has one side and another side. The input port has an axis and is fixed to the one side of the housing. The optical component has an optical surface whose normal makes an angle θ, which is different from 0° or 90°, against the axis of the optical port. The method comprises steps of: (a) placing a tool on a rotation stage that provides a reference wall, where the tool has a pair of sides extending in parallel to each other and a reference side that makes the angle θ against one of the sides, the process abutting one of the paired side of the tool against the reference wall of the rotation stage; (b) pointing the reference side of the tool toward a preset direction by rotating the rotation stage; (c) replacing the tool with the housing, where the process abuts the another side of the housing against the reference wall of the rotation stage; (d) aligning the normal of the optical component with the present direction; and (e) placing the optical component in a preset position within the housing.

DESCRIPTION OF EMBODIMENT

Next, embodiment according to the present invention will be described as referring to accompanying drawings. The present invention is not restricted to the embodiment. The invention is intended to have a scope including whole modification and changes determined by claims and equivalents thereto. In the description of the drawings, numerals or symbols same with or similar to each other will refer to elements same with or similar to each other without duplicating explanations.

First Embodiment

Figure 1:
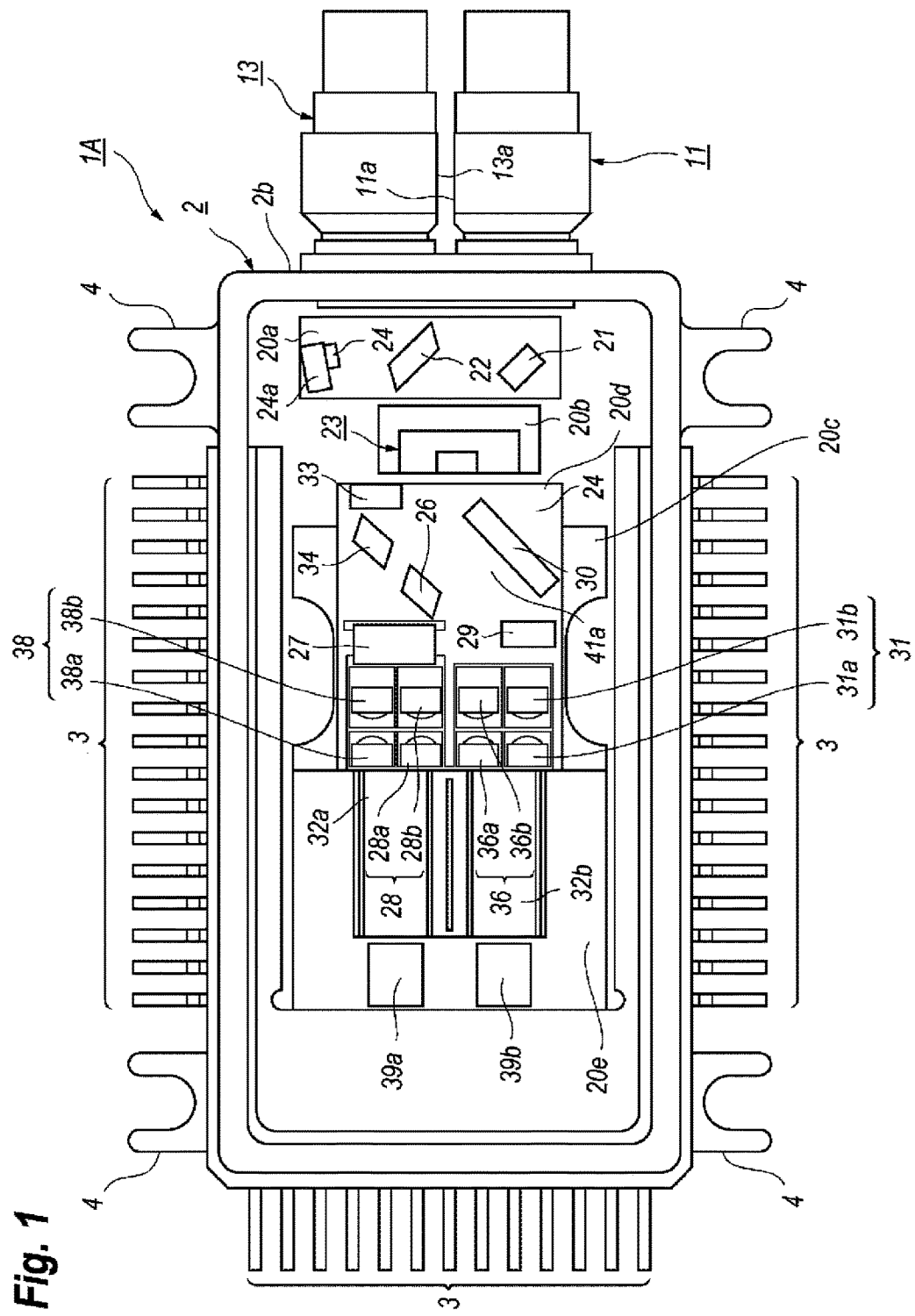
FIG. 1 is a plan view of an optical module according to the first embodiment of the present invention.
Figure 2:
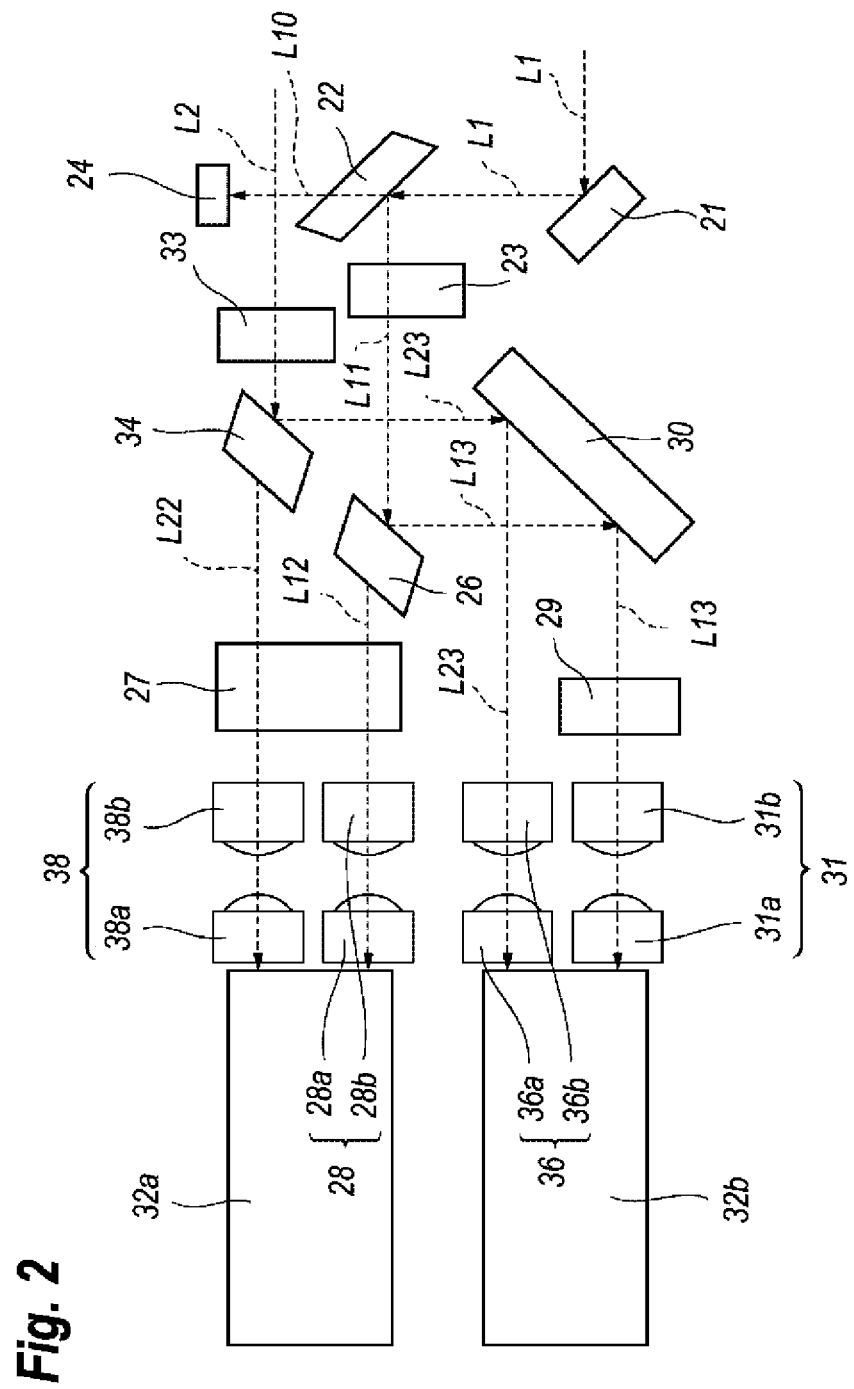
FIG. 2 schematically illustrates an optical coupling system between the multi-mode interference (MMI) devices and two ports.

FIG. 1 is a plan view of an optical module 1A according to the present invention and FIG. 2 schematically illustrates an optical coupling system implemented within the optical module 1A. The optical module 1A interferes signal light L1, which is modulated in a phase thereof, with local light L2 to extract information contained in the signal light L1. The signal light L1 subject to the optical module 1A of the present invention contains two polarizations perpendicular to each other and two phase components also perpendicular to each other, namely, a component modulated by phases between 0° and 180°, and another component modulated by phases between 90° and 270°, where the former phase component is often called as the In-phase component, while, the latter is called as the quadrature component. Such signal light is modulated by an algorithm called as Dual Polarization Quadrature Phase Shift Keying (DP-QPSK). The local light L2 primarily contains one of the polarizations, that is, the signal light has a linear polarization.

The optical module 1A provides a box-shaped housing 2, a signal port 11, and a local port 13, where these ports, 11 and 13, are provided in one of sides 2b of the housing 2. The signal port 11 and the local port 13 have respective optical axes parallel to each other and substantially perpendicular to the side 2b. The signal port 11 receives the signal light L1 through a single mode fiber (SMF), while, the local port 13 receives the local light L2 through a polarization maintaining fiber (PMF). The local light L1 and the signal light L2 enter within the housing 2 through the signal port 11 and the local port 13, respectively. The PMF extracted from the local port is coupled with an optical source that is typically a semiconductor laser diode (LD).

The signal port 11 integrates a cylindrical sleeve that receives an external ferrule with a lens holder that encloses a collimating lens therein, where the lens holder is fixed to an end 2b of the housing 2. The signal light L1, which propagates on the SMF, enters within the housing 2 as collimated by the collimating lens. The local port 13 also integrates a cylindrical sleeve that receives a ferrule secured in an end of the polarization maintaining fiber (PMF) with a lens holder that encloses another collimating lens therein, where the another lens holder is fixed to the end 2b of the housing 2. The local light L2, which propagates on the PMF, enters within the housing 2 as collimated by the other collimating lens.

Two input ports, 11 and 13, each includes cylindrical parts, namely, the sleeve, the lens holder, and so on; among which having the widest diameter, typically, the lens holder has a flat surface, 11a and 13a, facing to each other and sometimes being in contact to each other, which enables the optical axes of the input ports, 11 and 13, to be closer. The lens holders may have a diameter of 5.5 mm, which means that the interval between the optical axes to be 11 mm at least. However, the lens holder of the present embodiment having the respective flat surfaces may set the interval between the optical axes to be narrower than 10 mm; specifically, the interval between the optical axes is set to be 3.4 mm.

The housing 2 may be made of Kovar and provides terminals 3 in sides except for the side 2b to which the input ports, 11 and 13, are fixed. The terminals 3 each includes a multi-layered ceramics though which lead terminals are pulled out. The terminals 3 include those for outputting signals converted from the received optical signals, those for supplying biases and power to electronic circuits installed within the housing 2, and ground terminals. Respective corners of the housing 2 protrude flanges 4 to fix the housing 2 on a circuit board and so on.

The optical module 1A further includes the first and second multi-mode interference (MMI) devices that interfere the signal light L1 with the local light L2. The first MMI device 32a interferes the signal light L1 having one polarization with the local light L2 to recover information contained in this polarization; while, the second MMI device 32b interferes the signal light L1 having another polarization perpendicular to the former polarization with the local light L2 to recover another information contained in the latter polarization. These MMI devices, 32a and 32b, which are a type of, what is called the 90° optical hybrid, arranged in side by side with respective to the side 2b of the housing 2.

The optical module 1A further includes an optical coupling system that optical couples the two input ports, 11 and 13, with the two MMI devices, 32a and 32b. The optical coupling system includes a polarization beam splitter (PBS) 26, a skew adjustor 27, a half-wavelength (λ/2) plate, 29, mirrors, 21 and 30, beam slitters (BS) 22, and 34, a variable optical attenuator (VOA) 23, and four lens systems, 28, 31, 36, and 38. The mirror 21, the BS 22, and the VOA 23 are disposed between the input ports, 11 and 13, and the PBS 26.

Further specifically, a carrier 20a that is provided on a bottom of the housing mounts the mirror 21 and the BS 22 thereon; but the VOA 23 is mounted on a VOA carrier 20b that is independent of the former carrier 20a. Other optical components are mounted on a still other carrier 20d that is independent of two carriers, 20a and 20b, through a base 20c. The base 20c may be made of copper tungsten (CuW), while, the carriers, 20a, 20b, and 20d, may be made of aluminum nitride (AlN).

The mirror 21 of the present embodiment, which may be a type of a planar mirror, is disposed on the optical axis of the signal port 11. The mirror 21 provides a reflecting surface coupled to and facing the signal port 11. That is, the reflecting surface of the mirror 21 receives the signal light L1 and fully reflects the signal light L1 toward the BS 24. The optical axis of the outgoing signal light L1 toward the BS 22 makes a right angle with respect to the incoming signal light L1.

The BS 22, which is disposed on the optical axis of the signal light L1 reflected by the mirror 21, provides a body and an optical filter formed by multi-layered dielectric films where the body has a front surface and a rear surface opposite to the front surface, while, the optical filter made of the multi-layered dielectric films is disposed on the front surface. The optical filter shows reflectivity greater than 90%, where the BS 22 of the present embodiment has the reflectivity of 95%. The BS 22 splits the signal light L1 incoming from the mirror 21 into two portions, one L11 of which is reflected thereby toward the optical coupling system, while, the other transmits therethrough toward the mPD 24 as the signal light L10. The optical axis of the signal light L10 is aligned with the optical axis of the signal light L1, while, the optical axis of the signal light L11 reflected by the BS 22 makes a right angle against the optical axis of the signal light L1.

The mPD 24 is mounted on a side of a sub-mount 24a, and the sub-mount 24a is mounted on an end of the carrier 20a. The mPD 24, as referring to FIG. 2, is disposed behind the rear surface of the BS 22 to receive the signal light L10 transmitting through the BS 22. The mPD 24 may generate a photocurrent corresponding to the signal light L10 received thereby, and output the photocurrent to an external of the housing 2 through interconnections formed on the carrier 20a and bonding wires electrically connecting the interconnections with the terminals 3 provided in the side opposite to that facing the mPD 24.

The VOA 23 is disposed on the optical axis L11 of the signal light. That is, the VOA 23 is disposed on an optical axis of a signal input port of the first MMI device 32a. The VOA 23 may attenuate the signal light L11 passing therethrough. Specifically, depending on the magnitude of the photocurrent output from the mPD 24, the VOA 23 may adjust the magnitude of the signal light L11 passing therethrough. One of the terminals 3 may supply a control signal that may adjusts the attenuation by the VOA 23. When the mPD 24 detects an excess input, the VOA 23 increases the attenuation thereof to reduce the power of the signal light, L12 and L13, entering the MMI devices, 32a and 32b. The control signal is provided from the terminal 3 facing the mPD 24 directly to pads of the VOA 23 through bonding wires. The top of the VOA 23 provides the pads; accordingly, wire-bonding from the terminals 3 to the pads, the VOA 23 may receive the control signal. Because the carrier 20a for the mPD 24 has a top level thereof higher than a top level of the carrier 20b for the VOA 23 by about 1.5 mm, also, the top of the VOA 23 provides the pads to which the bonding wires are bonded; accordingly, the bonding wires never interfere with the optical axis L10 attributed to the mPD 24.

The PBS 26, which has a planar plate arrangement, has an incident surface facing the BS 22 through the VOA 23. The PBS 26 may split the signal light L11 into two portions, L12 and L13, where they have polarizations perpendicular to each other. For instance, the signal light L12 has a polarization parallel to the base 20d (X-polarization), while the other signal light L13 has another polarization perpendicular to the base 20d (Y-polarization) by a ratio of 1:1. The former signal light 12 transmits the PBS 26, while, the latter L13 is reflected thereby toward the mirror 30. That is, the signal light L13 propagates toward a direction opposite to the signal light L1 advancing the BS 22. The signal light L12 makes a right angle with respect the signal light L13.

The skew adjustor 27 and the lens system 28 are disposed on the optical axis of the signal light L12 from the PBS 26 to the signal input port of the first MMI device 32a. That is, the signal light L12 output from the PBS 26 transmits the skew adjustor 27 and enters the MMI device 32a through the lens system 28. The skew adjustor 27, which may be made of silicon (Si) block, compensates an optical path length for the signal light L13 from the PBS 26 to the mirror 30. That is, the signal light L13 has the optical path from the PBS 26 to the signal input port of the second MMI device 32b which is longer than the optical path for the signal light L12 from the PBS 26 to the signal input port of the first MMI device 32a by the optical path from the PBS 26 to the mirror 30. The skew adjustor 32 may compensate this optical path length by causing a delay for the signal light L12. The signal light L12 passing the skew adjustor 27 enters the signal input port of the first MMI device 32a through two lenses, 28a and 28b, of the lens system 28.

The λ/2 plate 29, the mirror 30, and the lens system 31 are disposed on the optical axis connecting the PBS 26 and the second MMI device 32b, that is, on the optical axis of the signal light L13. The signal light L13 reflected by the PBS 26 and having the Y-polarization is reflected again by the mirror so as to align the optical axis thereof with the signal input port of the second MMI device 32b. Passing through the λ/2 plate 29 and concentrated by two lenses, 31a and 31b, of the lens system 31, the signal light 13 enters the second MMI device 32b. The λ/2 plate 29 may rotate the polarization of light transmitting therethrough by 90°. Accordingly, the signal light L13 passing the λ/2 plate has the polarization parallel to the base 20c, namely, the polarization same with that of the other signal light L12 entering the first MMI device 32a. The embodiment disposes the λ/2 plate between the mirror 30 and the lens system 31; however, the optical coupling system may dispose the λ/2 plate in a position between the PBS 26 and the signal input port of the second MMI device 32b. For instance, the coupling system may dispose the λ/2 plate between the PBS 26 and the mirror 30.

The optical module 1A includes for optically coupling the local port 13 with two MMI devices, 32a and 32b, a polarizer 33, a BS 34, and lens systems 36 and 38, each including two lenses, 36a and 36b, and 38a and 38b. The coupling system for the local light L2 provides the skew adjustor 27 and the mirror 30 common to the optical coupling system for the signal light L1. That is, the skew adjustor 27 and the mirror 30 each has two optical axes for the signal light L1 and the local light L2 independent to each other.

The polarizer 33 secures the polarization of the local light L2 entering through the local port 13. That is, even when the PMF that carries the local light L2 deviates the polarization direction thereof from the designed direction during the assembly of the optical module 1A, the polarizer 33 may secure the polarization of the local light L2 substantially aligning with the designed direction, just perpendicular to or just parallel to the base 20c. When a system uses a semiconductor laser diode (LD) as a source of the local light 12, the LD generally emits light with elliptically polarized light with a major axis thereof in parallel to an active layer of the LD. However, the system sometimes installs an LD accompanied with a stress in the active layer due to the lattice mismatching to enhance oscillation stability, material reliability, and/or to tune an emission wavelength. Such an LD in the output light thereof sometimes enhances the minor axis of the elliptically polarized light. Even when the local light L2 has such an arrangement of the polarization, the polarizer 33 may convert the elliptically polarized light into linearly polarized light.

The BS 34, which may have a slab arrangement similar to the former BS 22, splits the local light L2 coming from the polarizer 33 into two portions by a ratio of 1:1, one of which L22 passes therethrough, while, the other L23 is reflected thereby toward the mirror 30. The local light L22 in the optical axis thereof makes a right angle with respect to the optical axis of the other local light L23. The local light L23 advances in parallel to the signal light L13 reflected by the PBS 26.

The system disposes the skew adjustor 27 and the lens system 38 between the BS 34 and the local input port of the first MMI device 32a, that is on the optical axis of the local input port of the first MMI device 32a. The local light L22 output from the BS 34 passes the skew adjustor 27 that compensates the optical path difference between the local light, L22 and L23. That is, similar to the signal light, L12 and L13, the local light L23 has an optical path from the BS 23 to the second MMI device 32b longer than the optical path for the local light L22 from the BS 34 to the first MMI device 32a by a length from the BS 34 to the mirror 30. The skew adjustor 27 may cause a phase delay for the local light L22 corresponding to this optical path from the BS 34 to mirror 30. The local light L22 passing the skew adjustor 27 enters the local input port of the first MMI device 38 as concentrated by two lenses, 38a and 38b, of the lens system 38.

The mirror 30 and the lens system 36 are disposed on the optical path for the local light L23 between the BS 34 and the local input port of the second MMI device 32b. The local light L23 split and reflected by the BS 34 is reflected again by the mirror 30 so as to align the optical axis thereof with the optical axis of the local input port of the second MMI device 32b. The local light L23 reflected by the mirror 30 enters the local input port 32b by concentrated by two lenses 36a and 36b of the lens system 36.

The optical module 1A thus described divides the signal light L1 and the local light L2 into respective two portions each entering the MMI devices, 32a and 32b. The MMI devices, 32a and 32b, which may be made of semiconductor material, for instance, indium phosphide (InP) that monolithically integrates photodiodes (PDs) therein, each extracts information contained in the signal light, L12 and L13, by interfering the signal light, L12 and L13 with the local light, L22 and L23. The photocurrents generated by the PDs integrated within the MMI devices, 32a and 32b, are converted into voltages signals by amplifiers, 39a and 39b, set downstream of the MMI devices, 32a and 32b. The MMI devices, 32a and 32b, are mounted on respective bases made of copper tungsten (CuW), while, the amplifiers, 39a and 39b, are mounted on a circuit board 20e each having a plane shape of a C-character that surrounds the MMI devices, 32a and 32b.

Next, a process of forming the optical module 1A will be described as referring to FIGS. 3 to 12. The description below assumes that optical components having light incident surfaces whose normals make an angle except for 0° and 90° against the optical axes of the input ports, 11 and 13, specifically, making an angle of 45°, are collectively as the first group of the components. The PBS 26, the mirror 30, and the BS 34 are involved in the first group. On the other hand, optical components having light incident surfaces whose normals make an angle supplementary to the former angle, that is, making an angle of 135°, are called as the second group of the components. The mirror 21 and the BS 22 are involved in the second group.

Figure 3:
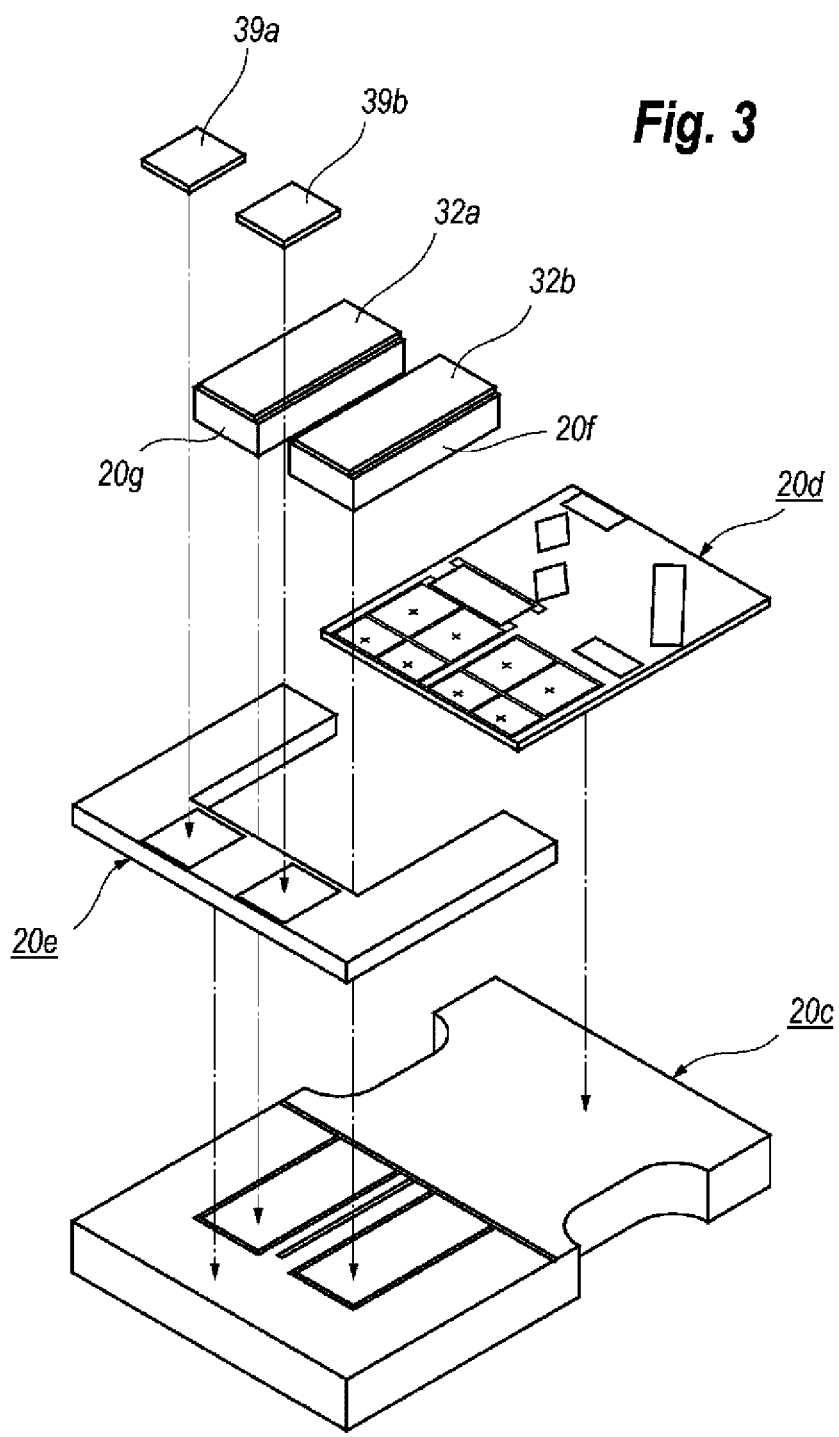
FIG. 3 illustrates a process of assembling the optical module, where the process places the MMI device on respective MMI carriers and a circuit board onto the base.
Figure 4:
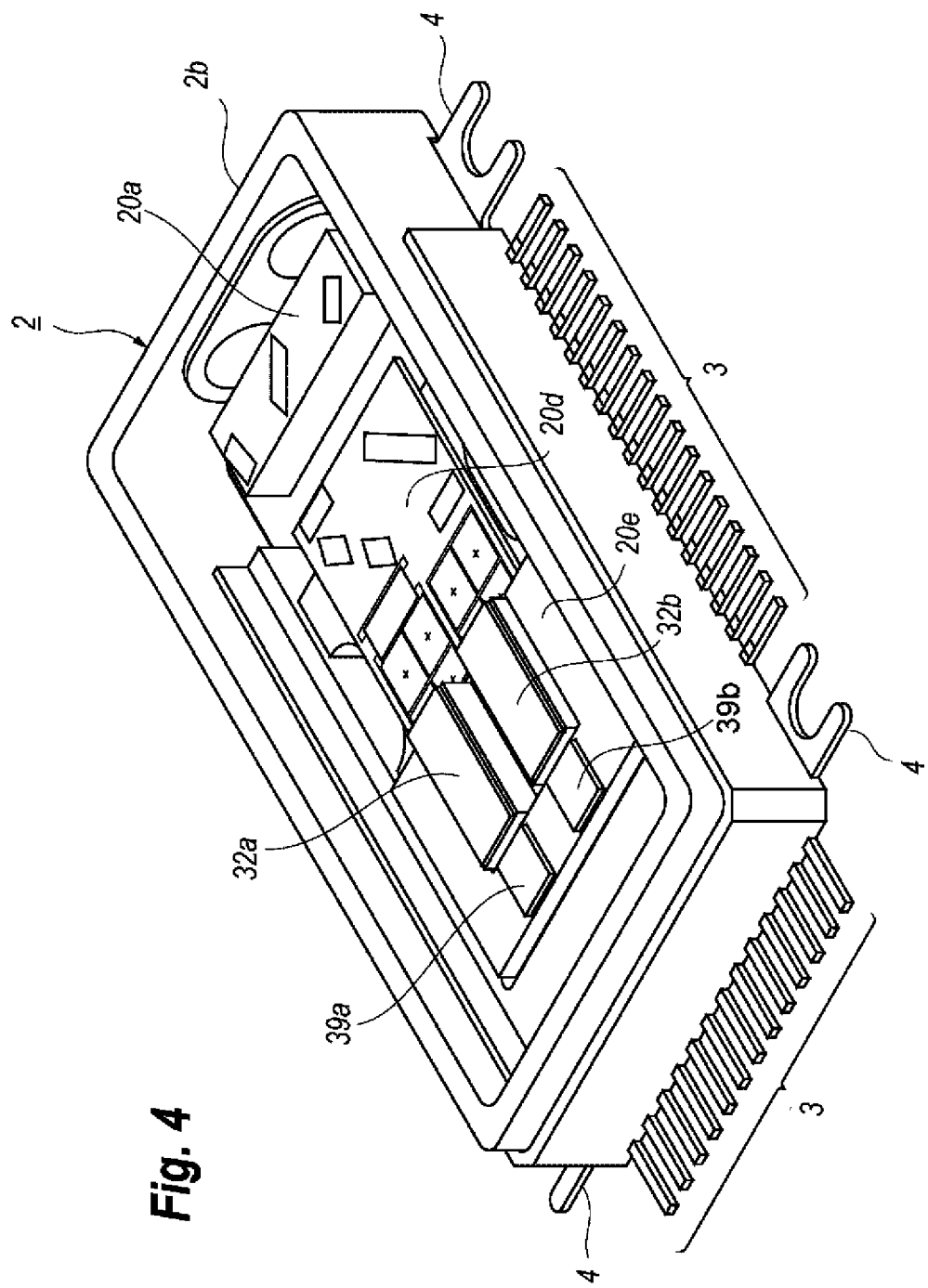
FIG. 4 illustrates a process of assembling the optical module, where the process installs an intermediate assembly on the base into the housing.

The process of forming the optical module 1A firstly assembles the MMI devices, 32a and 32b. Specifically, as FIG. 3 illustrates, the process disposes on the base 20c the MMI devices, 32a and 32b, the carrier 20d, and the circuit board 20e. The MMI devices are mounted on respective MMI carriers, 20f and 20g, in advance to the disposition, and the circuit board 20e also mounts electronic components such as capacitors thereon in advance to the disposition thereof. The MMI devices, 32a and 32b, are mounted on the MMI carriers, 20f and 20g, with eutectic solder such as alloy of gold and tin (AuSn). Then, the process installs the base 20c, on which the carrier 20d, the MMI devices, 32a and 32b, and the circuit board 20e are mounted, on the bottom of the housing 2 as FIG. 4 illustrates. Subsequently, the amplifiers, 39a and 39b, are installed on the circuit board 20e with conductive resin. The carrier 20a is also mounted on the bottom of the housing 2 independent of the base 20c. The carrier 20a is fixed on the bottom of the housing with conventional resin type of ultraviolet curable resin.

Figure 5:
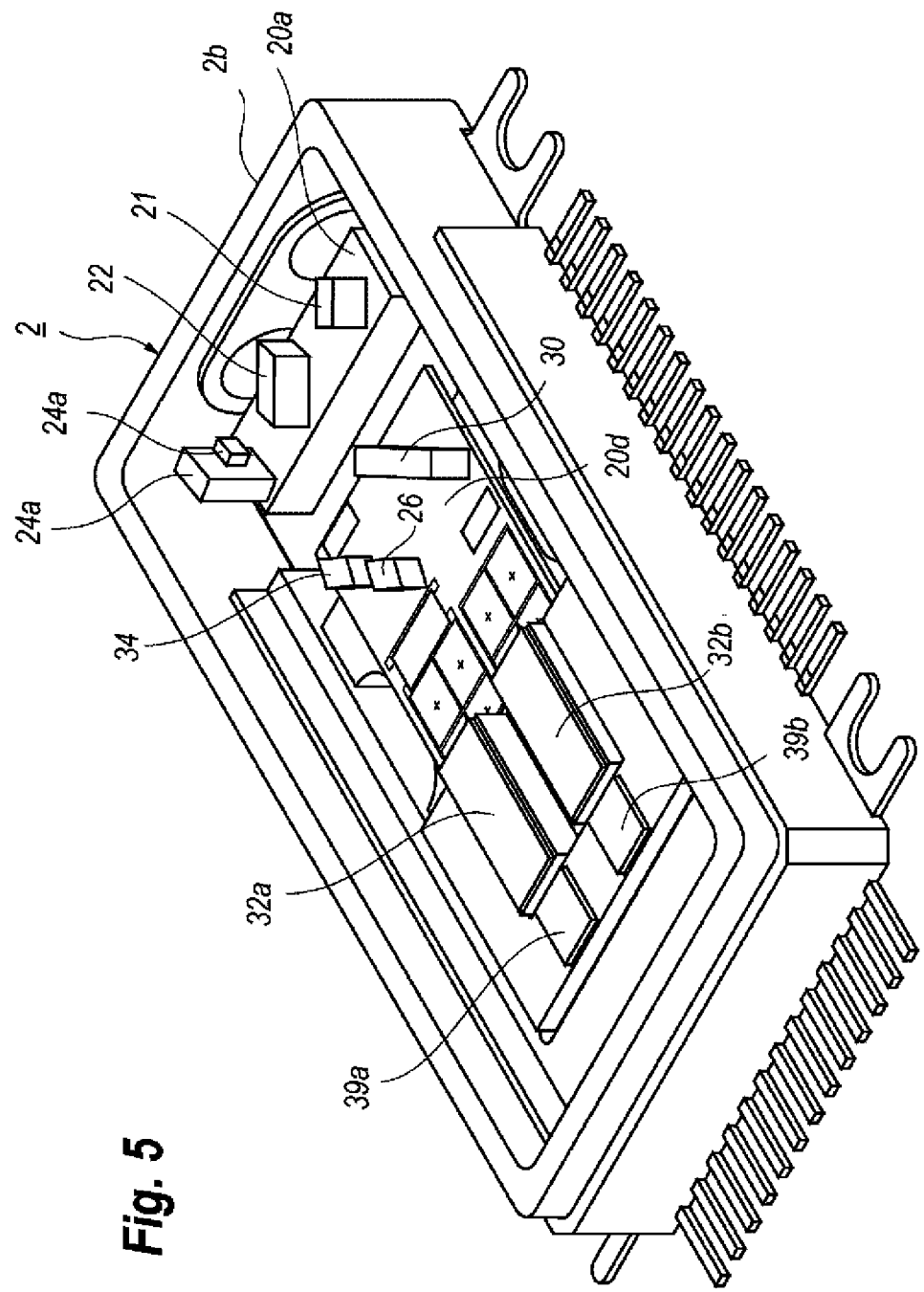
FIG. 5 illustrates a process of assembling the optical module, where the process places a monitor photodiode (mPD) on the PD carrier, and optical components of the first group and the second group on the carrier.

Next, as FIG. 5 illustrates, the process mounts the mPD 24 on the carrier 20a through the sub-mount 24a. Specifically, the mPD 24 is first mounted on the sub-mount 24a outside of the housing 2 so as to form an intermediate assembly; then, the process installs this intermediate assembly of the mPD 24 and the sub-mount 24a on the carrier 20a in the housing 2. The alignment of the intermediate assembly against the carrier 20a may be performed visually by marks prepared on the carrier 20a.

Figure 6:
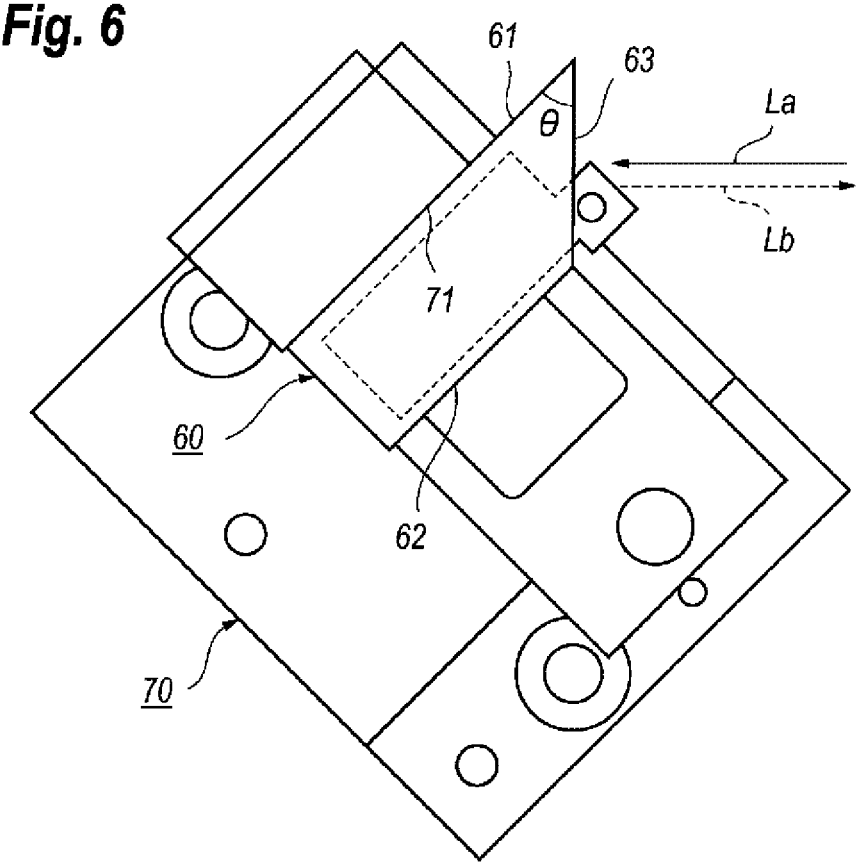
FIG. 6 illustrates a process of pointing a tool in the reference side thereof toward a preset direction in order to assemble the optical components of the first group.
Figure 7:
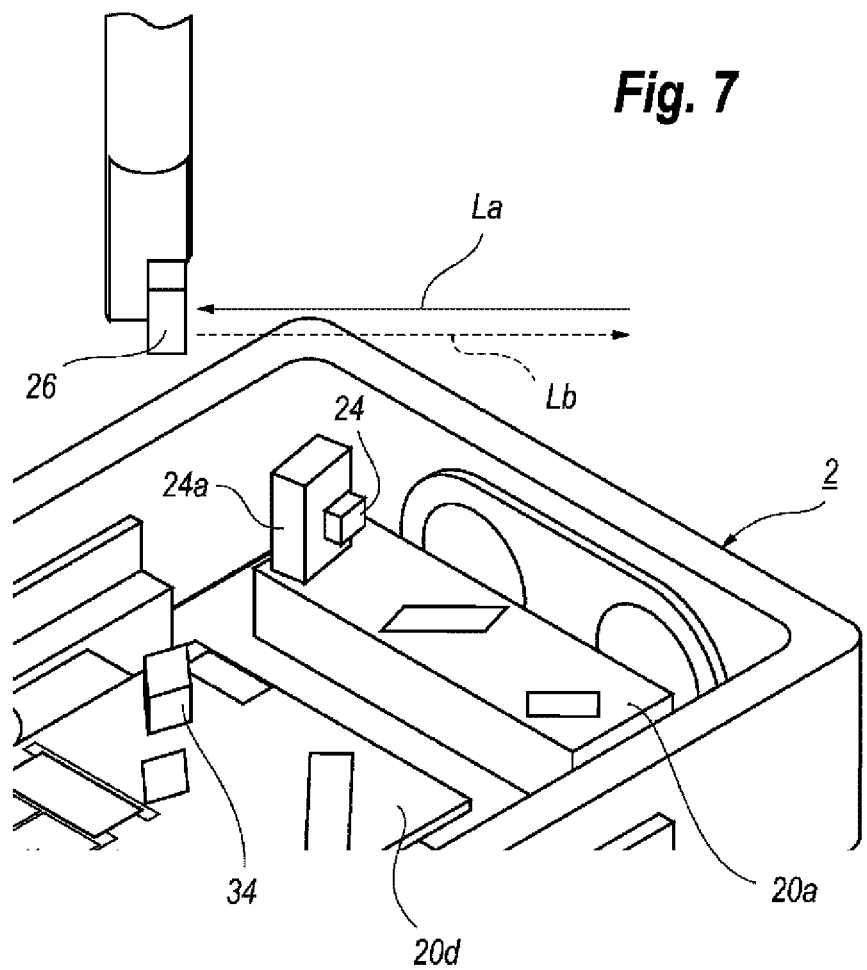
FIG. 7 illustrates a process of aligning the optical components of the first group with the present direction.

The process next fixes the first group of the components, namely, the PBS 26, the mirror 30 and the BS 34, on the carrier 20d with adhesive. FIGS. 6 and 7 illustrate the process of fixing the first group of the component on the carrier 20d in detail. The process uses a special tool 60 illustrated in FIG. 6, where the special tool 60 with a block shape provides a pair of sides, 61 and 62, extending in parallel to each other and another side 63 making an angle θ against one of the sides, 61 and 62, where the side 63 is called as the reference side. The embodiment shown in FIG. 6 indicates that the reference side 63 makes an angle θ against the side 61.

The process first aligns the front 2b of the housing 2 by a preset angle against the optical axes of the input ports, 11 and 13. Specifically, the process mounts the tool 60 described above on a rotation stage 70 such that one of the sides, 61 and 62, of the tool 60 abuts against the reference wall 71 prepared in the rotation stage 70. As irradiating the reference side 63 with a beam La output from the auto-collienter, which is not illustrated in FIG. 6, the process rotates the rotation stage 70 such that a beam Lb derived from the beam La and reflected by the reference side 63 returns the auto-collimeter. That is, the process rotates the rotation stage 70 such that the reflected beam Lb in the optical axis thereof aligns with the optical axis of the incident beam La. Thus, the reference wall 71 may be aligned with the angle thereof in a preset direction.

Then, the special tool 60 is replaced by the housing 2. That is, the process sets the housing 2 on the stag 70 as abutting one of the sides against the reference wall 71 of the stage 70. Then, as FIG. 7 illustrates, securing the component of the first group above the housing 2 and irradiating the incident surface of the component with the beam La, the component is aligned in an angle against the auto-collimater such that the optical axis of the reflected beam Lb is aligned with the incident beam La. Then, keeping the rotational angle of the component thus determined, the process installs the component in designed positions within the housing 2. Because the carrier 20d prepares indices for positioning the component, the component may be set on the preset position on the carrier 20d only by a visual inspection. Works thus described for the component is commonly performed for the PBS 26, the mirror 30, and the BS 34. In those alignment described above, only the beam provided from the auto-collimeter is used. No active alignment using the signal light or the local light is carried out.

Figure 8:
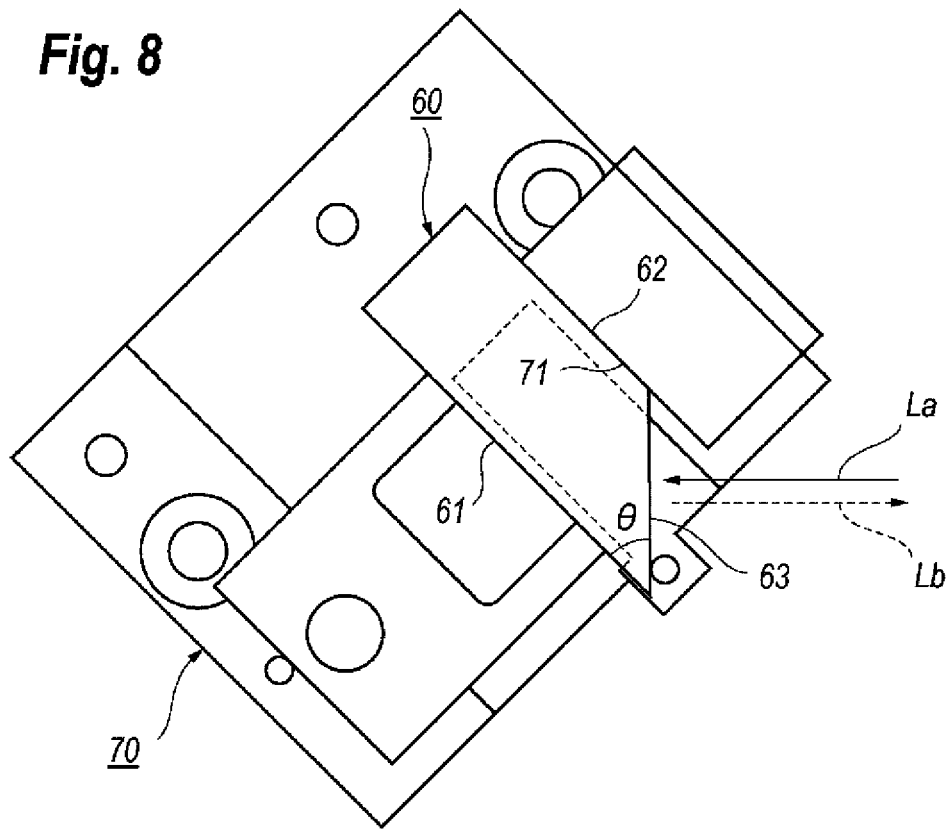
FIG. 8 illustrates a process of pointing the tool in the reference side thereof toward the preset direction in order to assemble the optical components of the second group.
Figure 9:
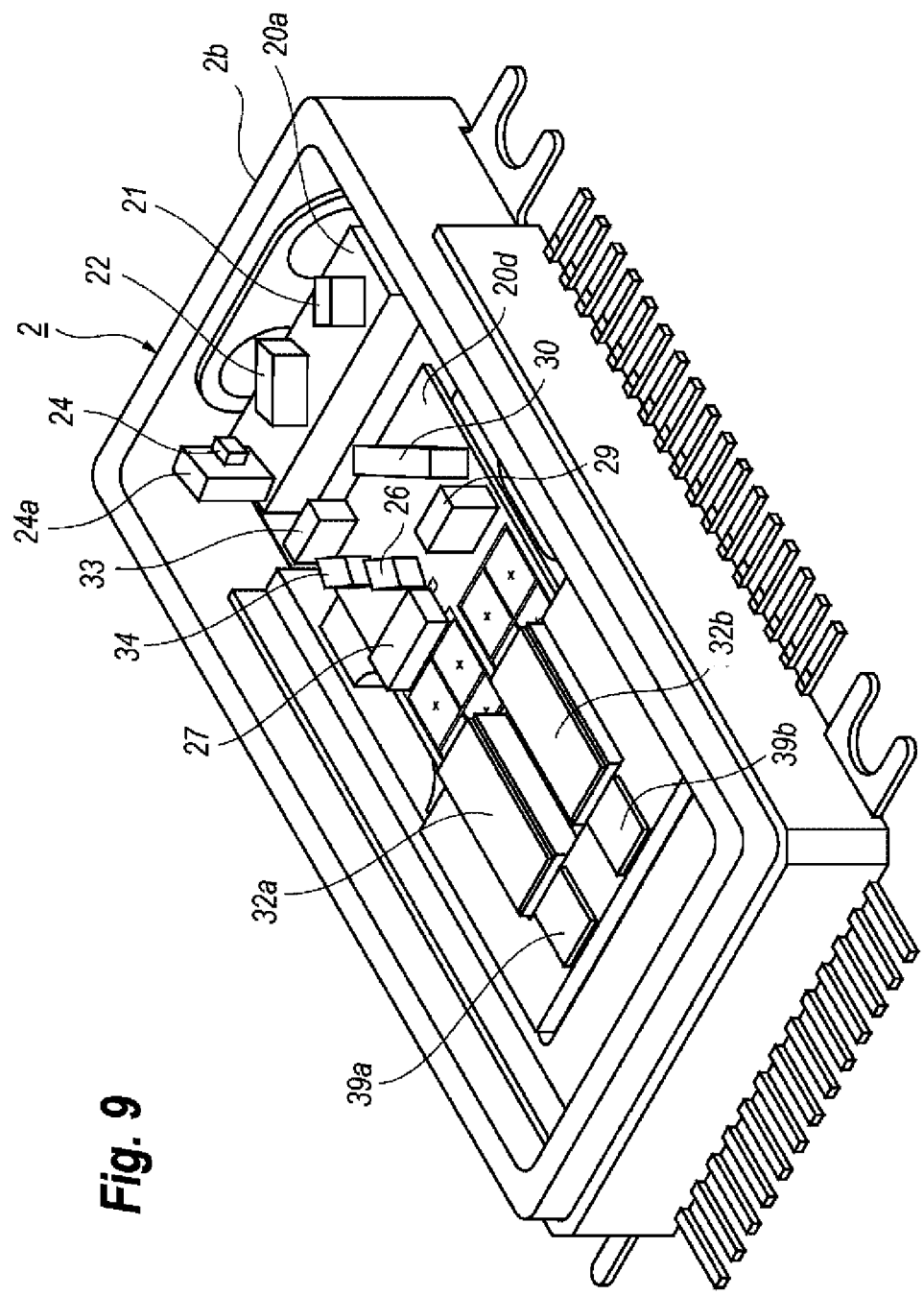
FIG. 9 illustrates a process of installing the optical components of the third group.
Figure 10:
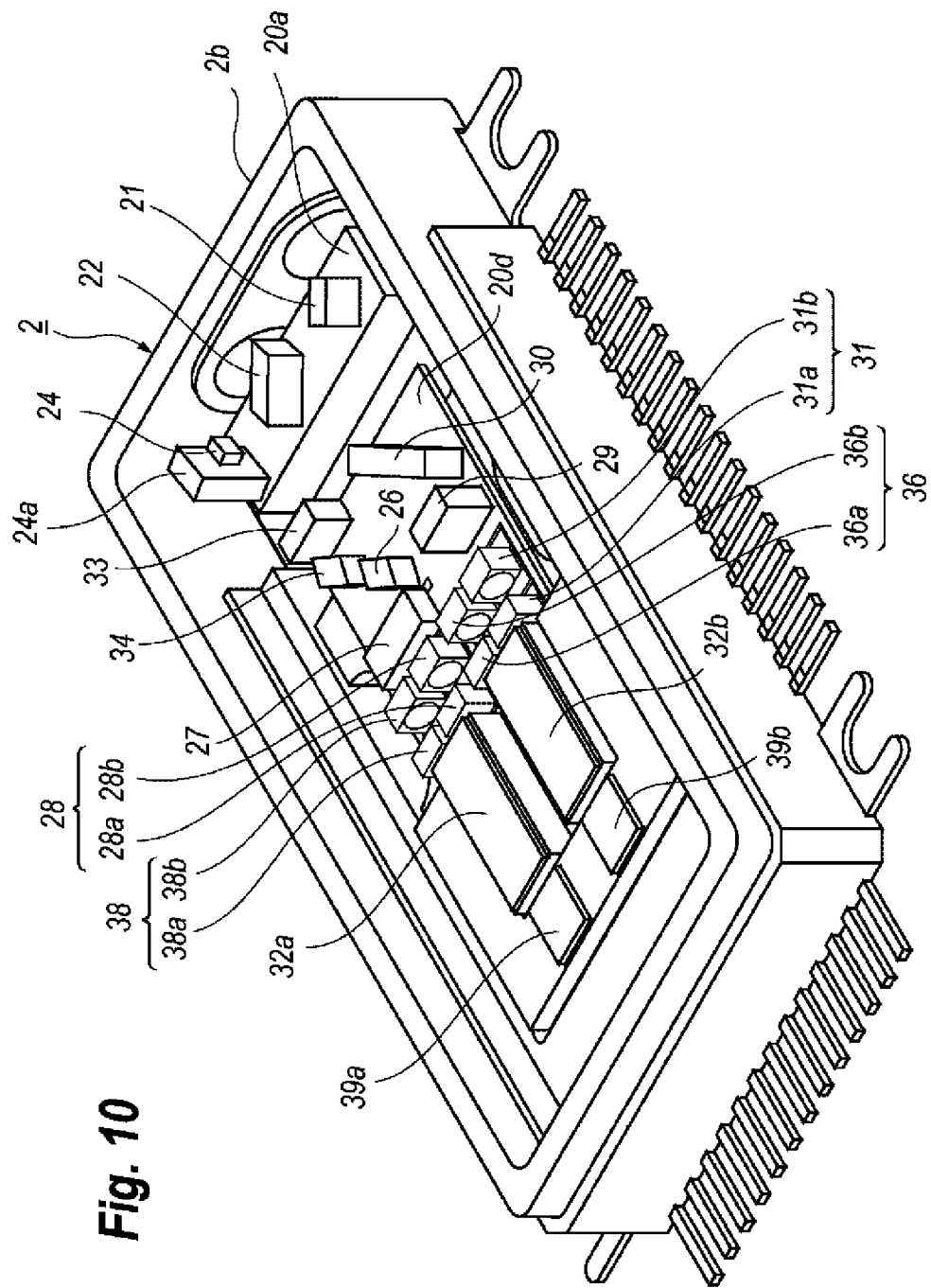
FIG. 10 illustrates a process of aligning the lens systems using dummy ports.

Referring to FIG. 5 again, the process then installs the components, namely, the mirror 21 and the BS 22, of the second group within the housing 2. Specifically, as FIG. 8 illustrates, the process first replaces the housing 2 set on the stage 70 to the special tool 60, where the special tool 60 is set on the stage upside down. Specifically, abutting the side 62 against the reference wall 71, that is, the side opposite to that first abutted against the reference wall for aligning the components of the first group, the process adjusts the rotation angle of the tool 60 as irradiating the reference side 63 with the beam coming from the auto-collimeter. Thus, the reference side 63 turns to the preset direction.

Then, replacing the special tool 60 with the housing 2 as abutting one side of the housing 2 against the reference wall 71, and the components of the second group are installed within the housing 2. Specifically, securing the component above the housing 2 and adjusting the rotation thereof by irradiating the incident surface with the beam provided from the auto-collimeter, the component is aligned in the angle thereof against the reference side of the housing 2 and placed on the carrier 20d. Similar to the components of the first group, no active alignment using the signal light and the local light is carried out for the components of the second group.

Subsequently, rest of the components having an incident surface making an angle of 0° or 90° against the axes of the input ports, 11 and 13, are installed within the housing 2. Those components, which are the skew adjustor 27, the λ/2 plate 29, and the polarizer 33, may be collectively included in the third group. Specifically, another tool, which has a rectangular block with two contiguous sides making a right angle, is set on the rotation stage 70 as abutting one of the contiguous sides against the reference wall 71. Irradiating the other of the contiguous sides with the beam provided from the auto-collimeter, the rotation angle of the tool may be aligned such that the beam reflected by the other of the contiguous sides in the optical axis thereof is aligned with the optical axis of the beam incoming to the other of the contiguous sides. Then, replacing the other tool with the housing 2 and setting the housing 2 as abutting the one side against the reference wall 71, the components of the third group are set on respective positions on the carrier 20d in the housing 2. Securing the components of the third group above the housing 2 and irradiating the incident surface with the beam from the auto-collimeter, the rotation of the components of the third group may be aligned against the auto-collimator. Then, the components of the third group are set within the housing 2.

Then, the lens systems, 28 to 38, are actively aligned and fixed on the carrier 20d. In advance to the alignment of the lens systems, 28 to 38, the process sets two dummy ports in the side 2b. The dummy ports, which simulate the input ports, 11 and 13, provide test beams with wavelengths equal to the signal light and the local light for aligning the lens systems, 28 to 38. The dummy ports each install a collimating lens; accordingly, the test beams provided therefrom are substantially collimated beams.

The dummy ports in positions thereof against the housing 2 are first determined. Importing the test beam from one of the dummy ports within the housing 2 and detecting the test beam passing the first to third components by the PDs integrated within the first MMI device 32, the process determines a temporal position of the dummy port against the housing 2 such that, as sliding the dummy port on the side 2b, the PD in the first MMI device 32a generates a maximum output. Similarly, another dummy port in the position thereof against the housing 2 may be determined as sliding the dummy port on the side 2b and detecting the test beam passing the first to third components by the PD integrated within the second MMI device 32b. Although the signal input port and the local input port of the MMI devices, 32a and 32b, have dimensions only several micron-meters square, and the first to third components are not actively nor passively aligned, the PDs integrated within the MMI devices, 32a and 32b, may vary the output thereof according to the positions of the dummy ports because the test beams output from the dummy ports are converted into the collimated beams.

The lens systems, 28 and 38, in particular, the respective first lenses, 28a to 38a, closer to the MMI devices, 32a and 32b, are first aligned. Placing the first lenses, 28a to 38a, on the carrier 20d and detecting the test beams by the PDs in the MMI devices, 32a and 32b, the first lenses, 28a to 38a, may be positioned at which the PDs generate respective maximum outputs; then, the first lenses, 28a to 38a, are offset from thus determined positions by a preset distance so as to apart from the MMI devices, 32a and 32b. After offsetting the first lenses, 28a to 38a, the first lenses, 28a to 38a, are fixed on the carrier 20d with, for instance, ultraviolet curable resin. Subsequently, the process aligns the second lenses, 28b to 38b, to be set relatively apart from the MMI devices, 32a and 32b, by ways substantially same with those for the first lenses, 28a to 38a.

The test beams output from the dummy ports enter the MMI devices, 32a and 32b, split by the PBS 26 and the BS 24, which means that the MMI devices, 32a and 32b, in the PDs integrated therein generally generate the uneven outputs before the alignment of the lens systems, 28 to 38. Therefore, the alignment of the lens systems, 28 to 38, first performs for the lens system attributed to the one of the MMI devices, 32a and 32a, showing lesser optical coupling with the dummy ports. That is, during the alignment of the dummy ports, the process compares the outputs of the MMI devices, 32a and 32b, to determine which MMI devices, 32a and 32b, shows a lesser optical coupling with the dummy port under alignment. Then, the process first aligns the lens system for the MMI device that shows the lesser optical coupling, then, the other lens system is aligned such that the optical coupling becomes substantially equal to that of the former lens system. Thus, the unevenness of the optical coupling for the MMI device between two dummy ports may be compensated. The adjustment of the optical coupling by the alignment of the lens system may be carried out by offsetting the respective second lenses, 28b to 38b, along the optical axes thereof.

Figure 11:
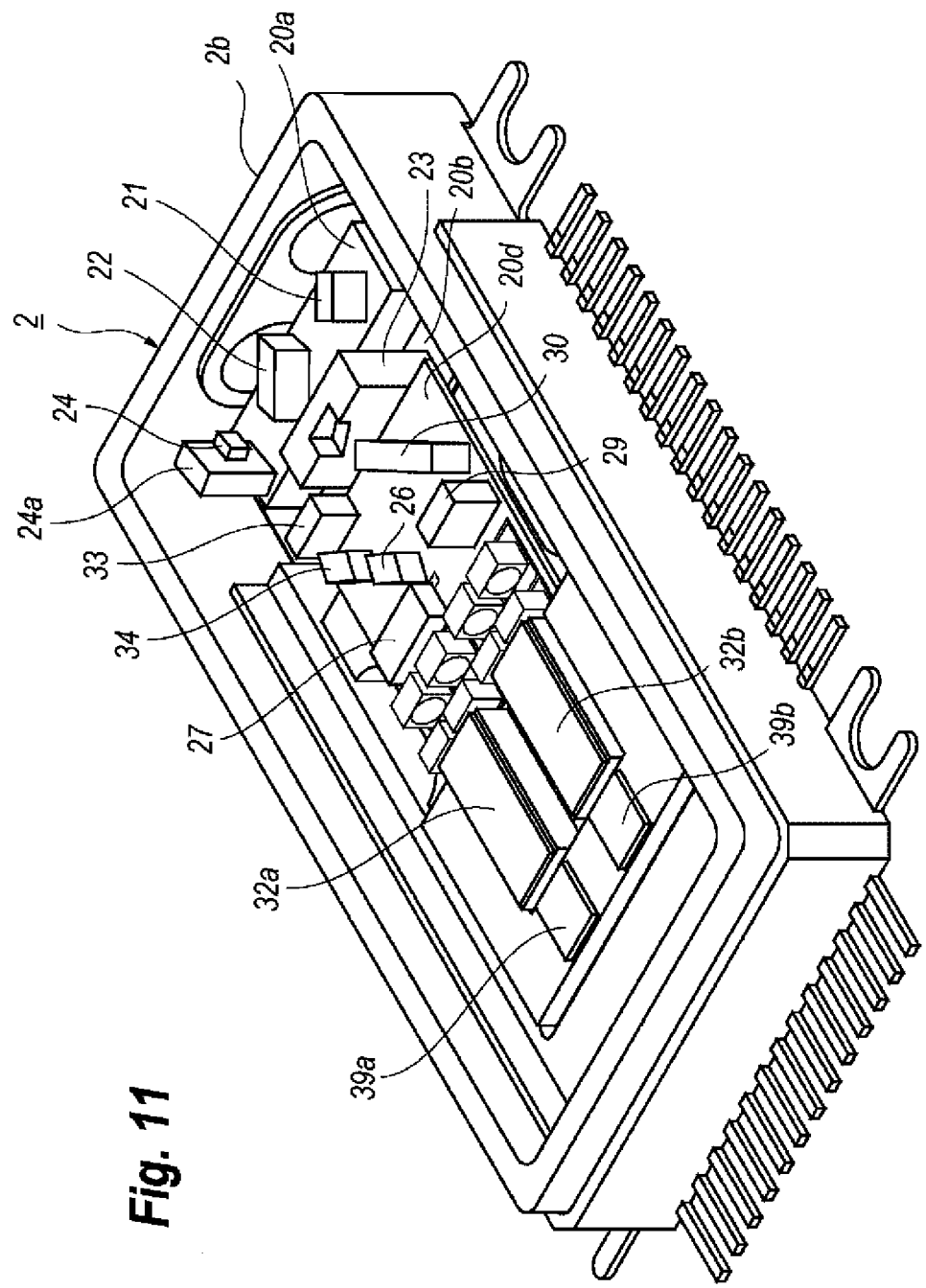
FIG. 11 illustrates a process of mounting a variable optical attenuator (VOA) on the VOA carrier.

Then, the VOA 23 is placed on the carrier 20b, as FIG. 11 illustrates. In this process of installing the VOA 23, holding the VOA 23 by a collet that provides an electrical signal to adjust the attenuation of the VOA 23 and providing the test beam from the dummy port that simulate the signal port 11, the PD integrated in the first MMI device 32a detects the test beam attenuated by the VOA 23 and passing the components of the first to third groups as checking an extinction ratio of the test beam caused by the VOA 23. The process fixes the VOA 23 at a position where the PD in the first MMI device 32a detects a maximum extinction ratio for the test beam. After the fixation of the VOA 23, the wire-bonding from the terminal 3 to the pads of the VOA 23 is carried out preferably at a temperature under which the ultraviolet resin for fixing the parts does not degrade.

Figure 12:
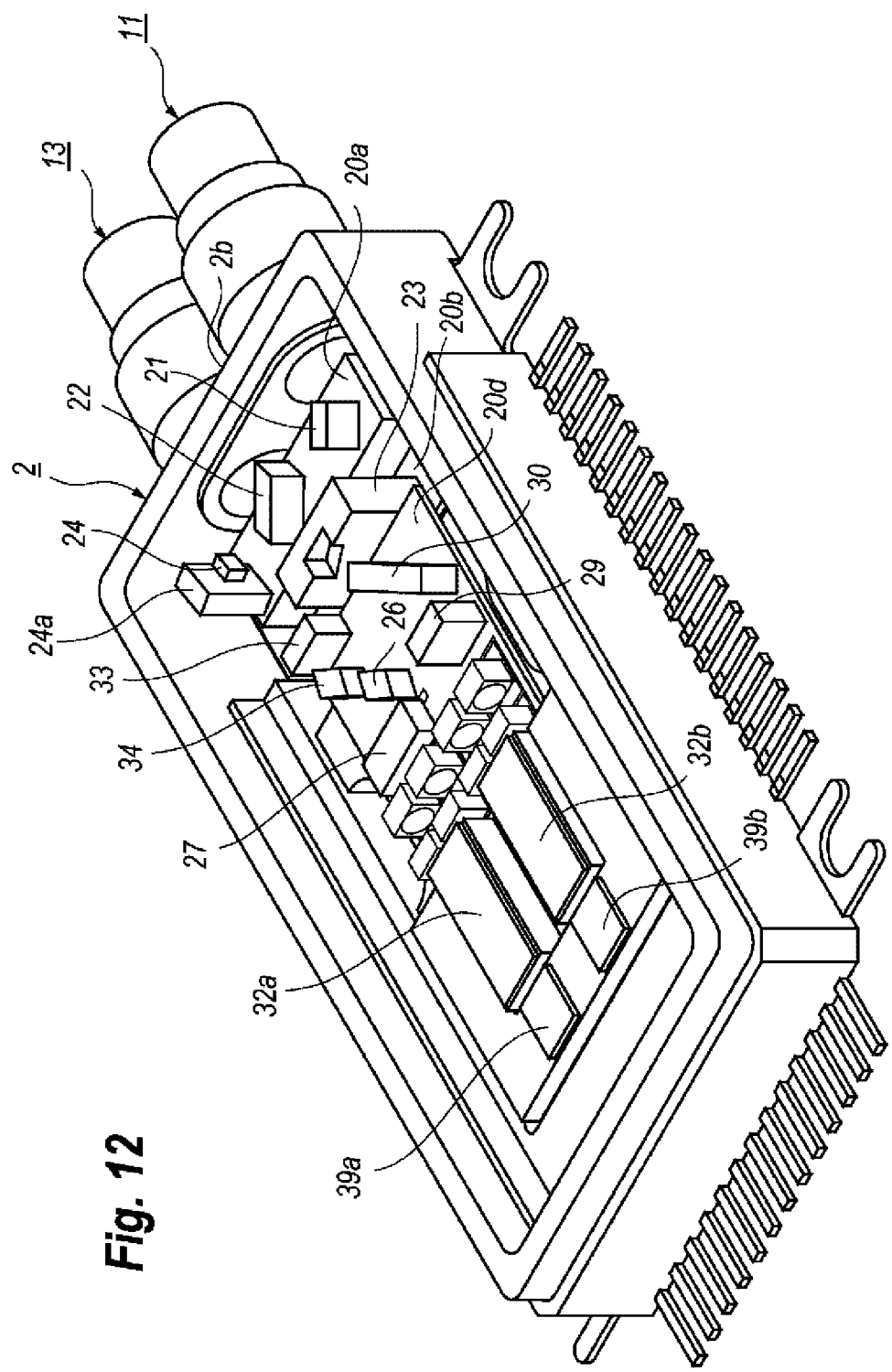
FIG. 12 illustrates a process of aligning a signal port and a local port by replacing from dummy ports for aligning the lens systems.

Finally, the process replaces the dummy ports to the signal port 11 and the local port 13 as FIG. 12 illustrates. The signal port 11 and the local port 13 are actively aligned such that the signal light is practically provided to the first MMI devices 32a. Monitoring the signal light by the PD in the first MMI device 32a as sliding the signal port 11 on the side 2b, the signal port 11 may be determined in the position thereof where the optical coupling becomes substantially equal to that obtained through the dummy port. The local port 13 is also determined in the portion on the side 2b through a process substantially same with those for the signal port 11, but the PD in the second MMI device 32b detects the local light. After the positions are thus determined, the signal port 11 and the local port 13 are welded to the side 2b of the housing 2. The local port 13 in the angle around the optical axis thereof is adjusted to a preset direction that is aligned with the polarization direction of the local light. Finally, the process covers the inside of the housing 2 with a lid as substituting an air therein with dry nitrogen. Thus, the process of forming the optical module 1A is completed.

The process of forming the optical module 1A of the present embodiment has features that the special tool 60 show in in FIGS. 6 and 8 determines the angle of the components of the first group, namely, the PBS 26, the mirror 30, and the BS 34, and those of the second group, namely, the mirror 32 and the BS 22. Even the respective incident surfaces of the components make angle except for 90° and 0° against the optical axes of the signal light and the local light, the components may be precisely aligned in the angle thereof without introducing complex steps. Moreover, the two groups of the components are aligned through the sole tool 60, that is, the tool 60 set in the normal direction is used for aligning the first group of components and the tool 60 set upside down is used for aligning the second group of components. Accordingly, even the reference side 63 makes an angle against the sides, 61 and 62, offset from 45°, the combination of the component of the first group and that of the second group may perform the parallel displacement of the optical axis.

Figure 15:
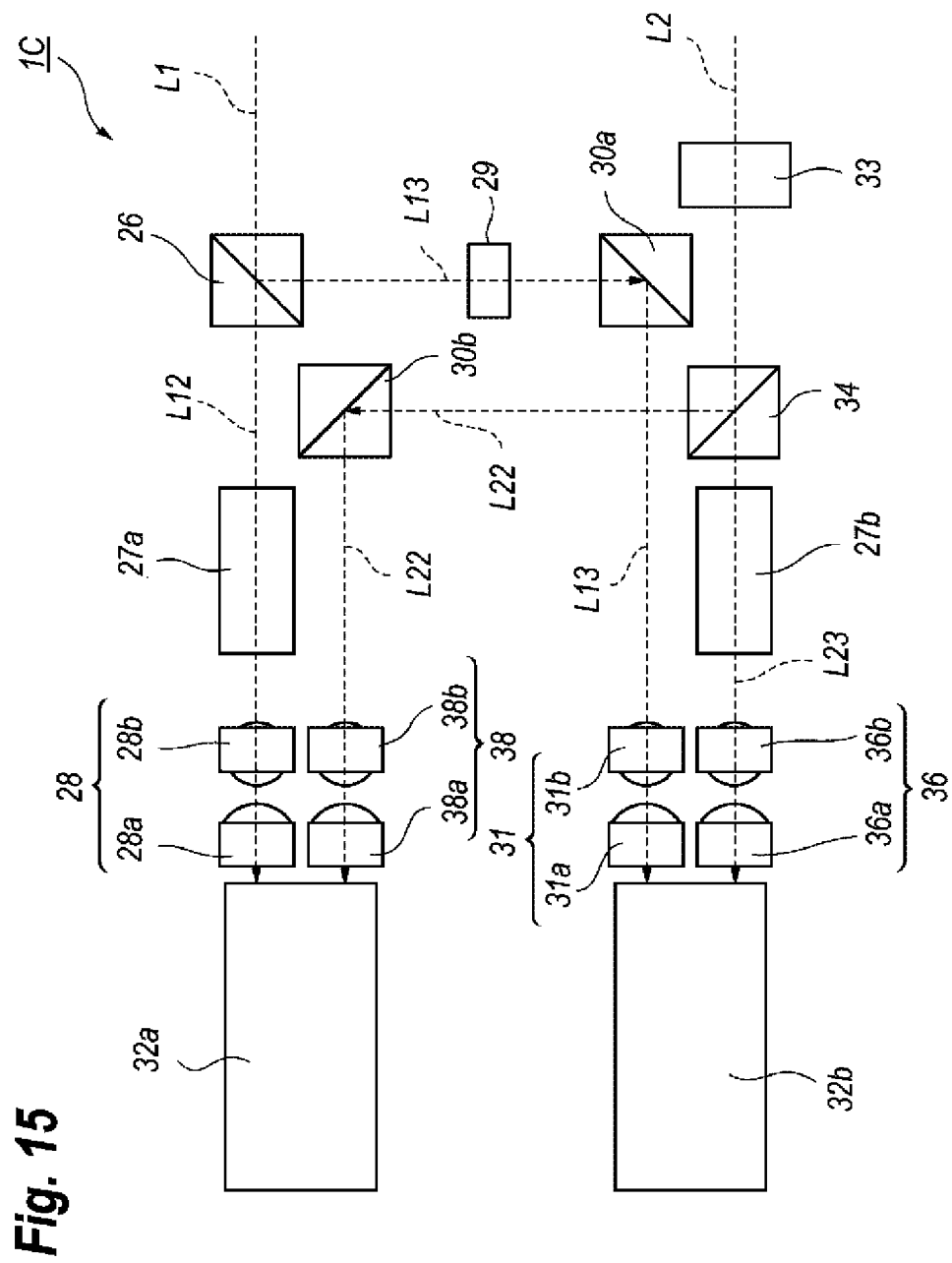
FIG. 15 schematically illustrates an optical coupling system from the signal port and the local port to two MMI devices according to an example comparable to that of the present optical modules.

Next, advantages of the optical module 1A will be described as comparing with an optical module 1C whose optical coupling system is schematically illustrated in FIG. 15. The optical module 1C has an arrangement distinguishable from those of the present optical module 1A is that the signal light L1 in the optical axis thereof is aligned with the optical axis of the signal input port of the first MMI device 32*a*. That is, a portion of the signal light L12 having the polarization thereof parallel to the base 20*c* output from the PBS 26 advances straight to the signal input port of the first MMI device 32*a*, while, the signal light L13 reflected by the PBS 26 enters the second MMI device 32*b* passing through the λ/2 plate 29 and reflected by the mirror 30*a*. On the other hand, the BS 34 also splits the local light L2 passing through the polarizer 33 into two parts, one of which L23 advances straight to the second MMI device 32*b*, while, the other part L22 reflected thereby enters the first MMI device 32*a* reflected again by the mirror 30*b*.

The optical module 1C thus described inherently has a subject, that is, the optical module 1C may not secure the duality of the signal light, L12 and L13, and the local light L22 and L23. Specifically, considering the signal light L12 and the local light L22 each entering the first MMI device 32*a*, the signal light L12 reaches the first MMI device 32*a* in straightforward from the signal port 11. On the other hand the local light L22 advances from the local port 13 to the first MMI device 32*a* after passing a path which is longer than a path for the signal light L12 by a distance from the BS 34 to the mirror 30*b*. Accordingly, the local light L22 entering the first MMI device 32*a* delays the phase thereof from that of the signal light L12. Similarly, for the second MMI device 32*b*, the signal light L13 delays the phase thereof from the local light L23 by an amount corresponding to a distance from the BS 34 to the mirror 30*b*.

Figure 16:
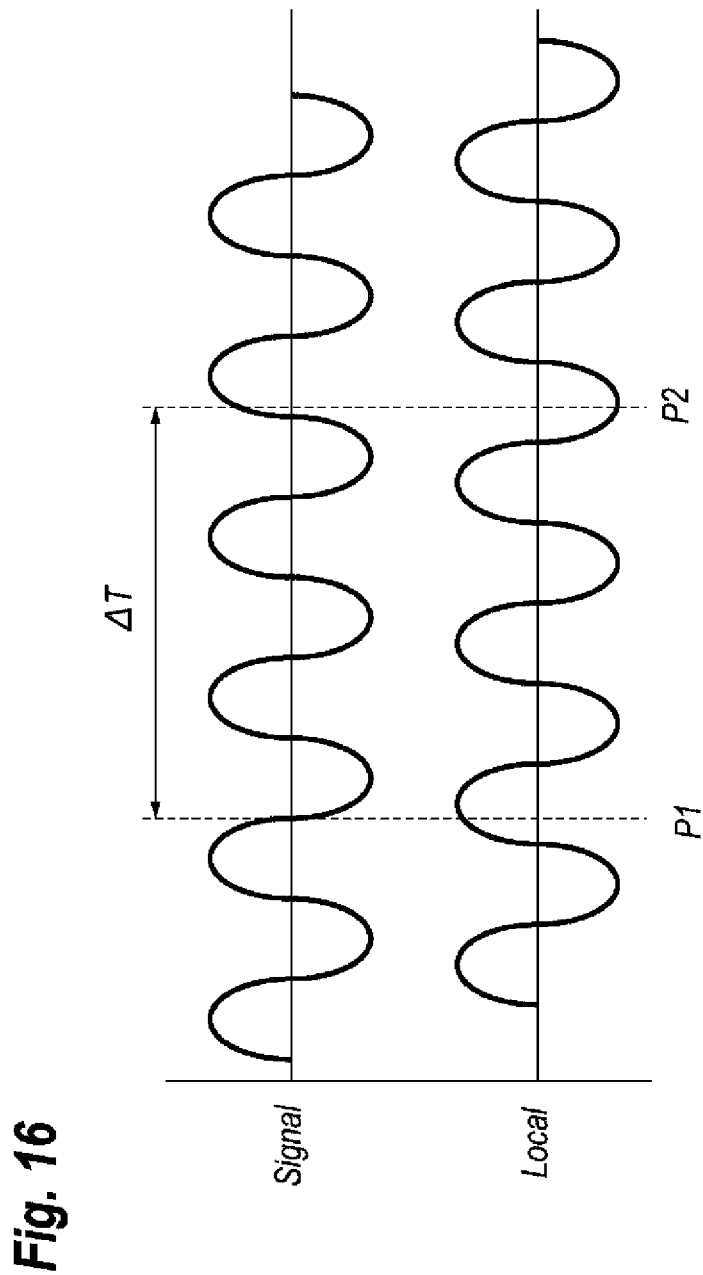
FIG. 16 schematically illustrates a phase mismatch between the signal light and the local light at the inputs of the MMI devices.

FIG. 16 schematically explains the phase delays described above. FIG. 16 shows the signal light and the local light, respectively, each entering the MMI devices, 32*a* and 32*b*. Assuming that the distance from the PBS 26 to the mirror 30*a*, or from the BS 34 to the mirror 30*b*, equivalently corresponds to a time difference ΔT, the first MMI device 32*a* interferes the signal light L12 at an instant P1 with the local light L22 at an instant P2 (=P1+ΔT). On the other hand, the second MMI device 32*b* interferes the local light L23 at an instant P1 with the signal light L13 at an instant P2.

Contrary to the optical module 1C, the optical module 1A of the present embodiment displaces the optical axis of the signal light L1 in parallel from that aligned with the signal port 11 to the side close to the local port 13 by the BS 21 and the mirror 22, which makes a distance between the optical axes of the signal light L1 and the local light L2 substantially equal to a distance between the signal input port and the local input port of the first MMI device 32*a*. Moreover, the signal light L12 output from the PBS 26 and the local light L22 concurrently enters the first MMI device 32*a* as keeping the translational position thereof. Also, the signal light L13 and the local light L23 concurrently enters the second MMI device 32*b* as keeping the translational position thereof.

The optical module 1A recovers data by interfering the signal light with the local light and processing the extracted signal by a digital signal processor (DSP) implemented downstream of the MMI device, or exactly, the downstream of the PDs integrated within the MMI device. The DSP may compensate the phase difference between two MMI devices, which enhances the preciseness of the information recovery. However, when the signal light and the local light entering the MMI device shows a phase difference at the input thereof, the DSP deteriorates the preciseness of the recovery of the information. The optical module 1A of the present invention may secure the duality of the signal light and the local light, L12 and L22, and L13 and L23, which may suppress the degradation in the preciseness in the recovery of the information in the DSP.

The skew adjustors, 27*a* and 27*b*, in the conventional optical module 1C may compensate the delay in the phase due to the optical path differences. However, those skew adjustors, 27*a* and 27*b*, are provided for adjusting the phase delay between the signal light L12 and L13, or between the local light L22 and L23, not for adjusting the phase difference between the signal light L12 and the local light L23, or the signal light L13 and the local light L22. The skew adjustors, 27*a* and 27*b*, are made of silicon (Si), specifically, the skew adjustors, 27*a* and 27*b*, are quarried out from a Si wafer with a thickness of about 1 mm and anti-reflection coatings in a top and a back surfaces. Tolerance in the thickness thereof directly reflects in a scattering of an optical path length, or a phase delay. The conventional optical module 1C provides two skew adjustors, 27*a* and 27*b*, independent to each other. Accordingly, the scattering in the thickness of the Si wafer directly reflects in the performance of the interference in the MMI devices, 32*a* and 32*b*. The skew adjustors, 27*a* and 27*b*, may compensate the phase delay ΔT in a certain extent, but the compensated delay ΔT for the first MMI device 32*a* is possibly different from the compensated delay ΔT for the second MMI device 32*b*. The optical module 1A of the present embodiment provides only one skew adjustor 27 for the signal light L12 and the local light L22, which suppresses the tolerance originated from two skew adjustors, 27*a* and 27*b*, independent to each other.

Also, the conventional optical module 1C is necessary to arrange the signal port 11 aligned with the signal input port of the first MMI device 32*a*, and the local port 13 aligned with the local input port of the second MMI device 32*b*. Accordingly, an interval between the signal input port and the local input port in an MMI device, and an interval between two MMI devices, 32*a* and 32*b*, automatically determines an interval between the signal port 11 and the local port 13. A maximum curvature of waveguides implemented within the MMI device, which is determined from an optical loss in the waveguides, automatically determines a minimum interval between the signal input port and the local input port. Thus, two ports, 11 and 13, are restricted in a minimum interval thereof.

The optical module 1A, because the BS 21 and the mirror 22 makes the parallel translation of the optical axis of the signal light L1 from that aligned with the signal port 11 to a position closer to the optical axis of the local port 13. Accordingly, adjusting an interval between the BS 21 and the mirror 22, the interval between the signal port 11 and the local port 13 may be optionally adjustable. For instance, two ports, 11 and 13, are integrally formed. That is, two fibers, one of which is a signal mode fiber SMF for the signal light and the other is a polarization maintaining fiber PMF for the local light, may be extracted from a single port.

Second Embodiment

Figure 13:
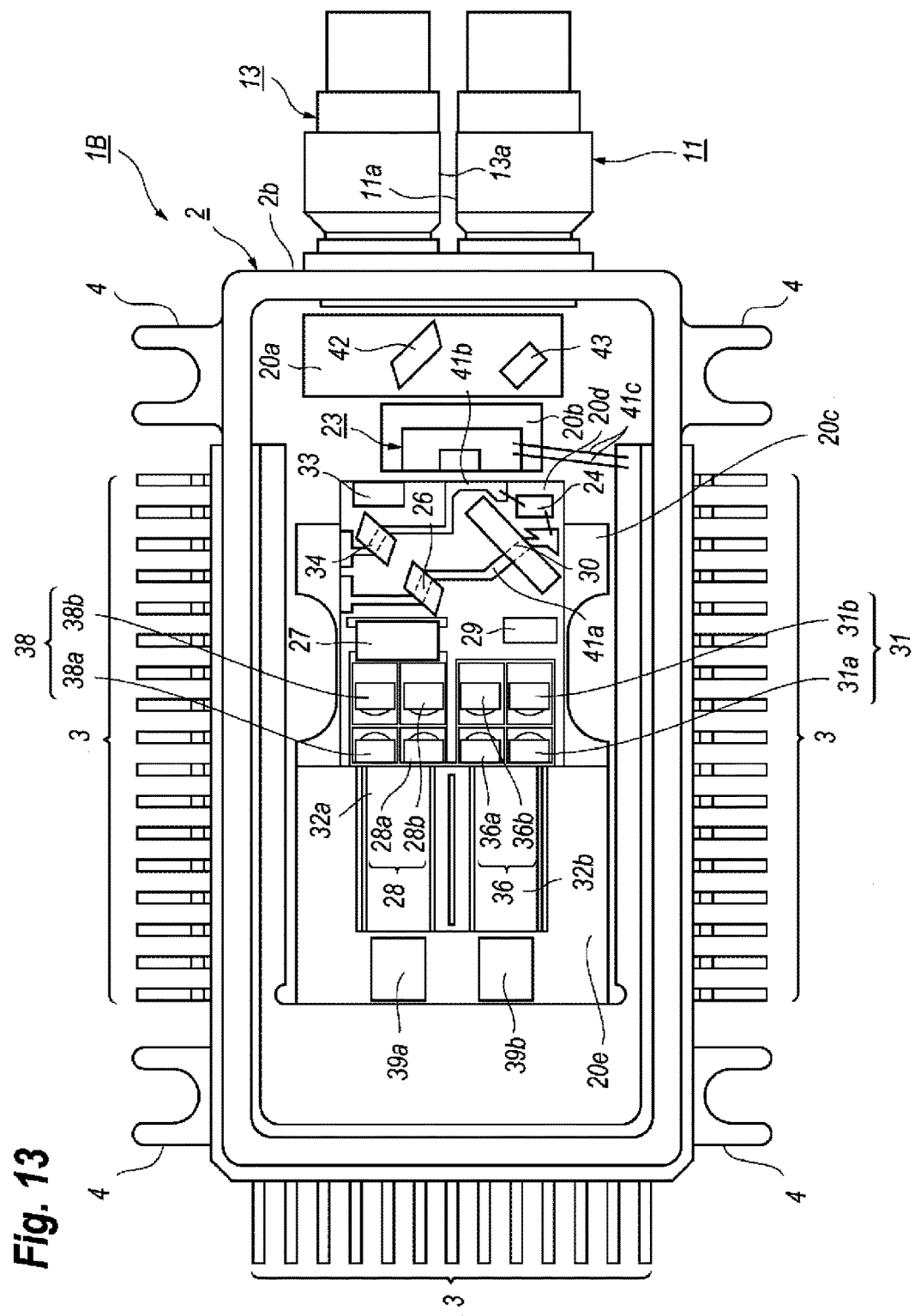
FIG. 13 is a plan view of an optical module according to the second embodiment of the present invention.
Figure 14:
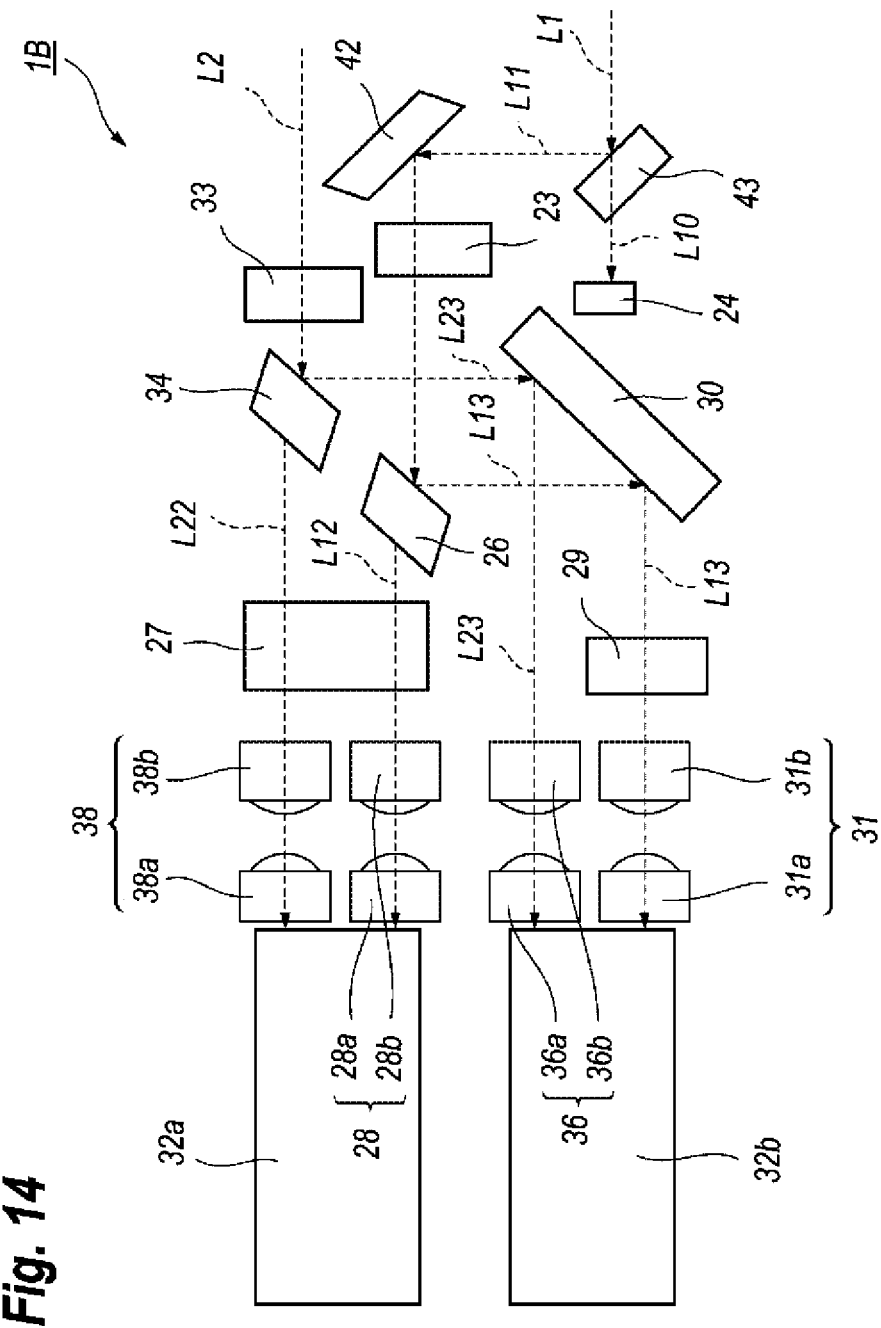
FIG. 14 schematically illustrates an optical coupling system between the multi-mode interference (MMI) devices and two ports of the optical module shown in FIG. 13.

FIG. 13 is a plan view of an optical module 1B according to the second embodiment of the present invention, and FIG. 14 schematically illustrates the optical coupling system implemented within the optical module 1B shown in FIG. 13. The optical module 1B has a feature distinguishable from the optical module 1A of the first embodiment that the optical module 1B provides the mPD 24 in a position different from that of the first embodiment. That is, the optical module 1B provides a mirror 42 replaced from the BS 21 and a BS 43 replaced from the mirror 22. The mPD 24 of the optical module 1B is set behind the BS 43. The BS 43 and the mirror 42 are mounted on the carrier 20a, while, the mPD 24 is mounted on the other carrier 20d.

The signal light L1 entering through the signal port 11 is first split by the BS 43 into a portion of the signal light L10 and another portion of the signal light L11. The former portion L10 transmits the BS 43 and enters the mPD 24; while the other portion L11 is reflected by the BS 43, reflected again by the mirror 42, then enters in the VOA 23. In the aforementioned module 1A shown in FIG. 1, the signal light L10 transmitting the BS 22 in the optical axis thereof crosses the optical axis of the local light L2 provided from the local port 13. This arrangement of the optical module 1A leaves possibility for the local light L2 interfering with the signal light L10 entering the mPD 24. When the local light L2 excessively interferes with the signal light L10, the mPD 24 may not detect the power of the signal light L10 exactly, which disturbs the attenuation by the VOA 23.

The optical module 1B of the present embodiment places the BS 43 and the mPD 24 on the optical axis of the signal port 11, where the BS 43 transmits a portion of the signal light L10 toward the mPD 24. Thus, the optical axis of the signal light L10 does not intersect the optical axis of the local light L2, which secures the optical isolation between the signal light L10 and the local light L2, and the mPD 24 may generate the photocurrent just corresponding to the signal light L10.

In the optical modules, 1A and 1B, of the present invention, the signal port 11 and the local port 13 provide the collimating lenses to convert the signal light L1 and the local light L2 into respective collimating beams to be process by the optical coupling system assembled on the base 20c. The optical components implemented within the housing 2 inevitably cause stray light by Fresnel reflection at respective incident surfaces. When the optical coupling system processes the collimated beams, the stray light caused by the respective components is left in substantial amplitude even when the optical path length of the stray light becomes longer compared with a case the coupling system processes a concentrated beam. This condition of the stray light is reflected on the mPD 24 in the same way. That is, the optical coupling system processing the collimated beam is further influenced by the stray light compared with the case where the system processes the concentrated beam. The optical arrangement of the mPD 24 and the BS 43 may suppress the interfering between the signal light L10 and the local light L2.

The mPD 24 of the present embodiment is mounted on the carrier 20d that also mounts the optical components optically coupling the signal port 11 and the local port 13 with the MMI devices, 32a and 32b. The carrier 20d further provides interconnections, 41a and 41b, extending so as to traverse the carrier 20d. As FIG. 13 illustrates, the optical components, 26, 30, and 34, may be mounted on the interconnections, 41a and 41b, because the interconnections, 41a and 41b, carry the signal corresponding to the average optical power of the signal light, that is, the signal only contains DC components. Even any members are mounted thereon so as to be in contact thereto, the signal does not degrade the quality thereof. Moreover, the interconnections, 41a and 41b, do not interfere with the optical axes of the optical components, 26, 30 and 34. Thus, the interconnections, 41a and 41b, may be traverse the carrier 20c so as to mount the optical components, 26, 30, and 34, thereon. The mPD 24 may extract the signal to the terminals 3 in the side of the second MMI device 32b through bonding wires.

Third Embodiment

Figure 17:
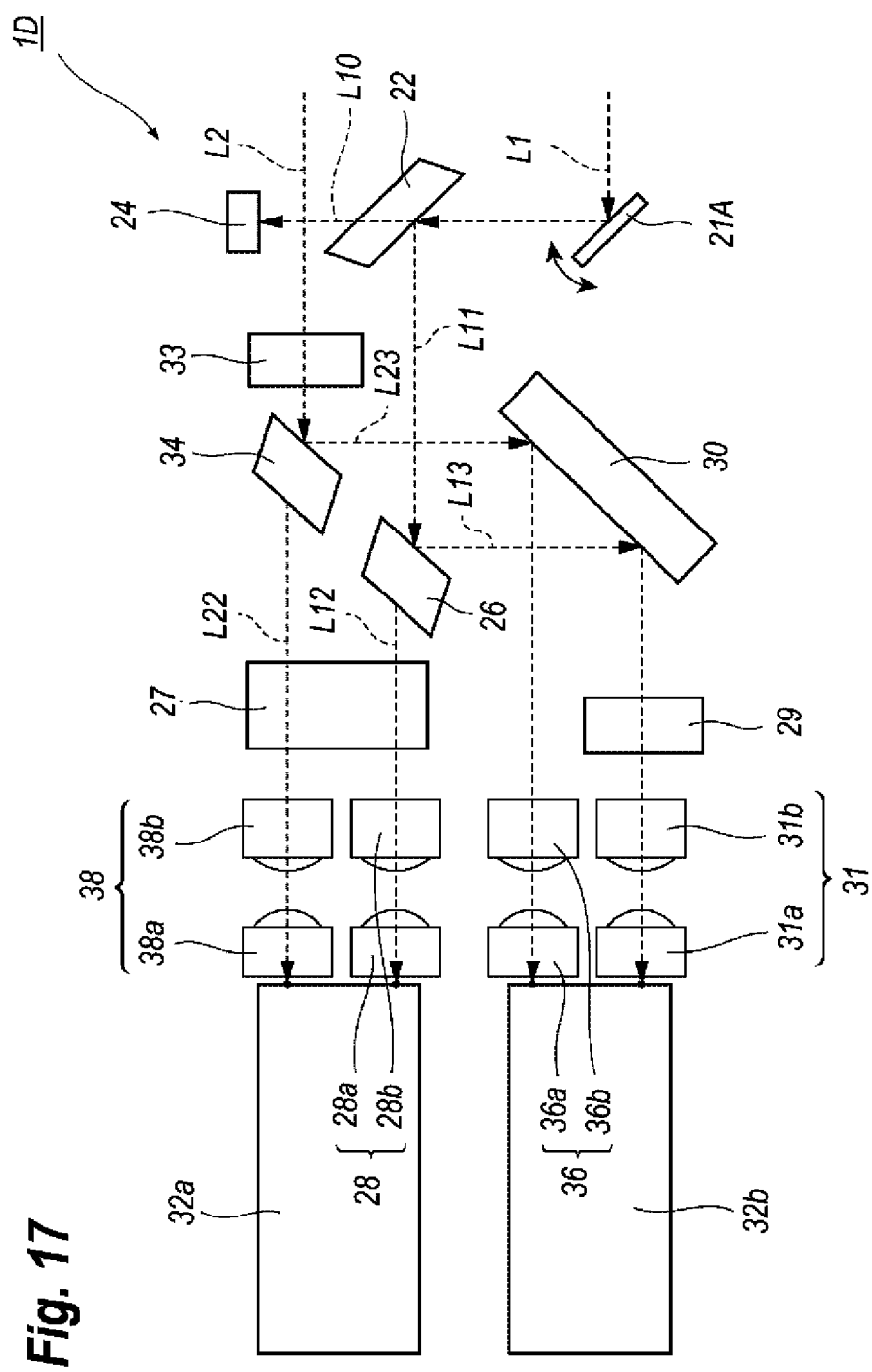
FIG. 17 schematically illustrates an optical coupling system of an optical module according to the third embodiment of the present invention

Next, still another optical module 1C according to the third embodiment of the present invention will be described. FIG. 17 shows an optical coupling system of the optical module 1D, which is modified from the optical coupling system of the first embodiment shown in FIG. 2. The optical coupling system of the third embodiment has a feature distinguishable from that of the first embodiment that the VOA 23 in the first embodiment is removed but the mirror 21 set on the optical path of the signal light L1 is replaced to a tilting mirror 21A with an rotation axis perpendicular to the surface of the carrier 20a. Other arrangements of the optical coupling system are substantially same with those of the first embodiment.

The signal port 11 and the local port 13, which are same with those of the first embodiment, provide the collimating lenses and output the signal light L1 and the local L2 as the collimated beams having diameters of 240 to 260 μm. On the other hand, the signal input port and the local input port in the MMI devices, 32a and 32b, have dimensions of, in the unit of the mode field diameter (MFD), 2.2 to 2.8 μm.

Rotating the tiling minor around an axis thereof, the signal light L1 reflected thereby pivots the optical axis, which varies the planes projected on the signal input ports of the MMI devices, 32a and 32b, and the areas overlapping with the ports. Thus, the rotation of the tilting mirror may show a function of an optical attenuator.

The tilting mirror 21A receives a bias that sets the tilt angle thereof from an outside of the optical module 1D. When the mPD 24 detects excess power for the signal light L1, the bias to increase the tilt angle of the tilting mirror 21A to narrower the overlapping areas of the signal light, L12 and L13, with the signal input ports of the MMI devices, 32a and 32b.

Figure 18:
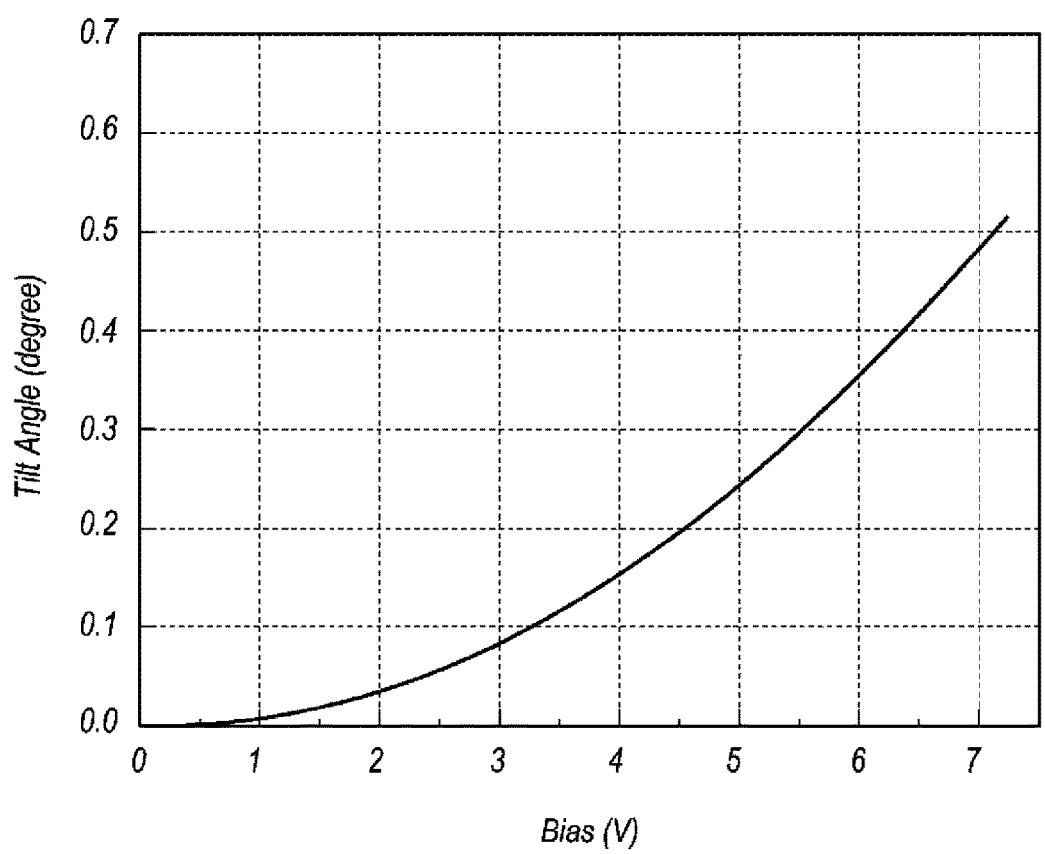
FIG. 18 shows a behavior of a tilt angle against a bias supplied thereto in a tilt mirror implemented within the optical module shown in FIG. 17.
Figure 19:
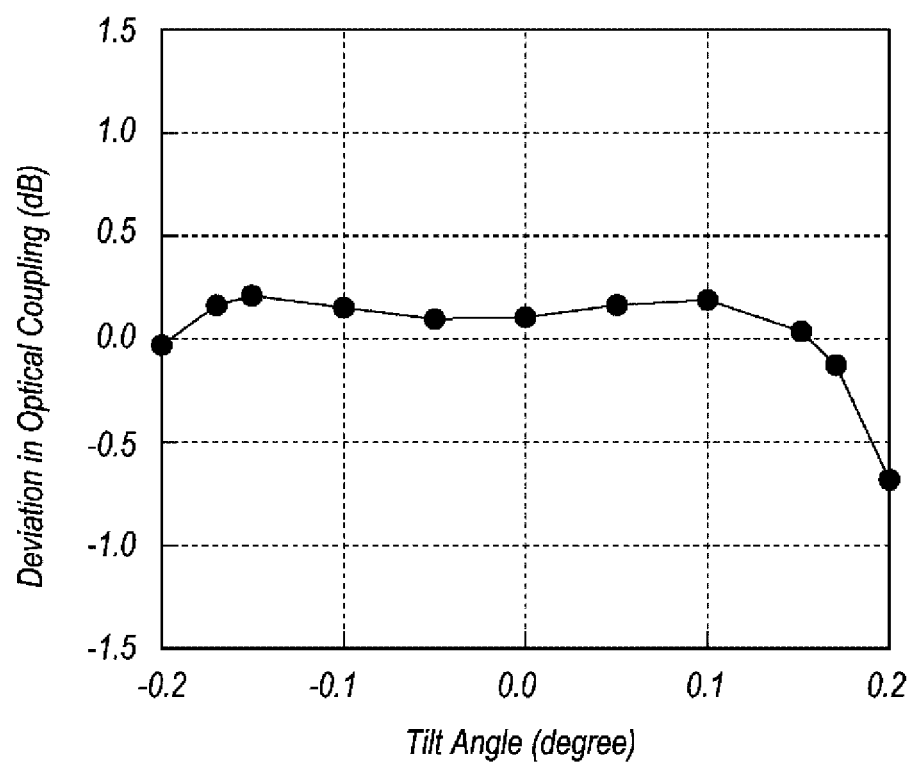
FIG. 19 shows a deviation between two MMI devices in the optical coupling between the tilt mirror and the MMI devices.
Figure 20:
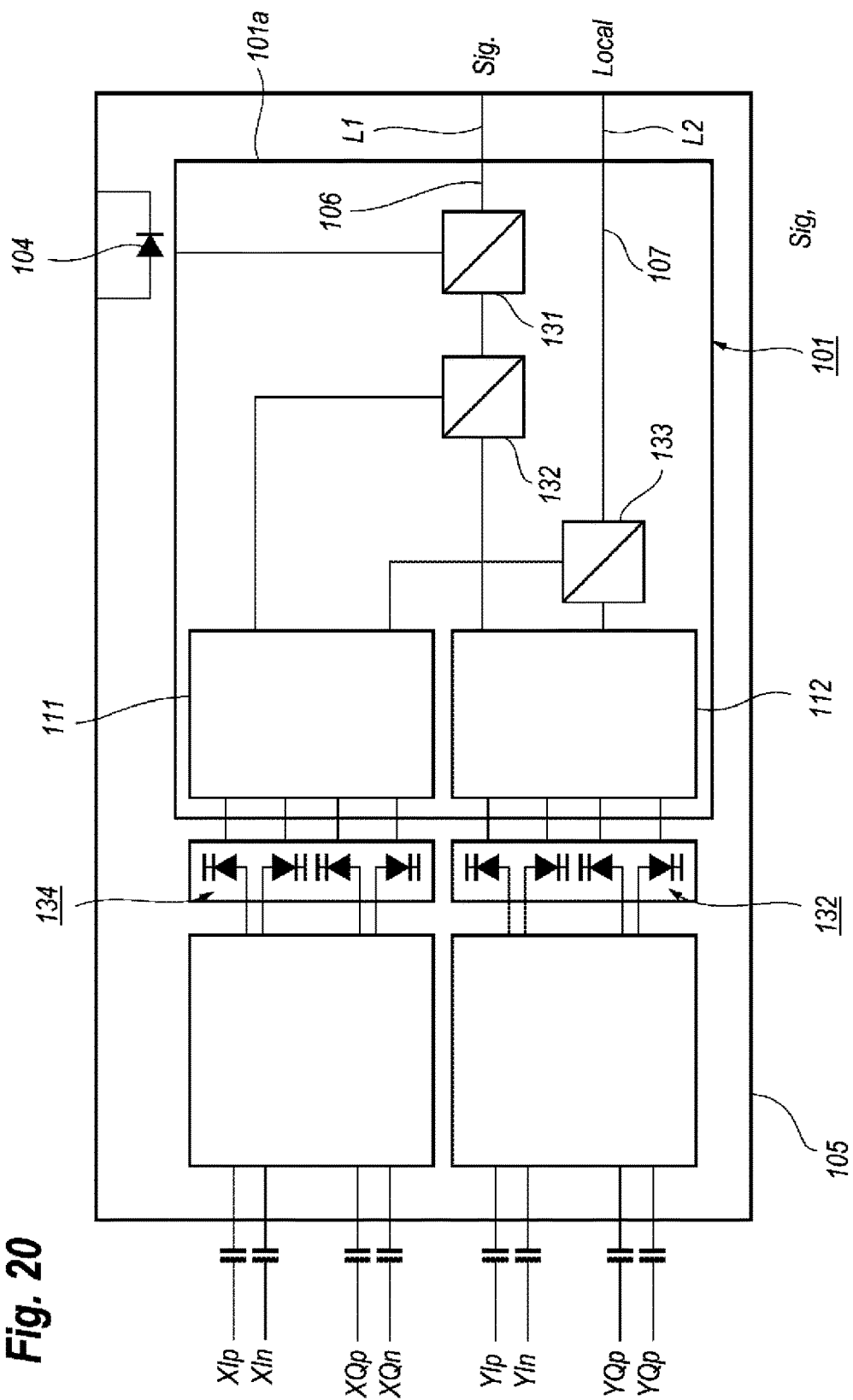
FIG. 20 schematically illustrates a conventional arrangement of an optical module that includes two MMI devices and an optical coupling system from the signal port and the local port to the MMI devices.

FIG. 18 shows a relation between the bias provided to the tilt mirror in the horizontal axis against the tilt angle in the vertical axis, where the tilt angle 0° corresponds to a state that the primary surface of the tilt mirror 21A makes an angle of 45° against the optical axis of the signal light L1. Supplying the bias of 7 V, the tilt minor 21A rotates about 0.5°. FIG. 19 shows the deviation between two MMI devices, 32a and 32b, in the optical coupling between the signal light L1 and the signal input ports thereof. The deviation shown in FIG. 19 is within ±0.5 dB in a tilt angle in a range of ±0.2°.

The optical module 1D of the present embodiment splits, by the BS 26, the signal light L11 into two beams, L12 and L13, each coupling with the signal ports of the MMI devices, 32a and 32b. However, the signal light L13 has the optical path from the BS 26 to the MMI device 32b longer than the optical path for the signal light L12 to be coupled with the other MMI device 32a. The optical path from the tilt mirror 21A to the signal port of the first MMI device 32a is about 12.5 mm, while, that to the signal port of the second MMI device 32b is about 15.0 mm. Thus, about 2.5 mm difference is left in the optical module 1D of the embodiment. This difference is substantially equal to a distance from the BS 26 to the mirror 30, or the spam between the signal input ports of the MMI devices, 32a and 32b. Table below summarizes the relation between the tilt angle and the offset from be center of the signal input ports, where the center corresponds to a condition of the tilt angle 0°. Because the evaluation excludes the function of the lens system, 28 and 31, the offsets of the beams become substantial compared with the dimension of the signal input ports of the MMI devices, 32a and 32b.

TABLE 1

|  | path length | 0.05° | 0.10° | 0.15° | 0.20° |
| --- | --- | --- | --- | --- | --- |
| 1$^{st}$ MMI Device | 12.5 mm | 10.9 | 21.8 | 32.7 | 43.5 |
| 2$^{nd}$ MMI Device | 15.0 mm | 13.1 | 26.2 | 39.3 | 52.4 |

The lens systems, 28 and 31, practically concentrate the signal light, L12 and L13, onto the signal input ports, where the field diameter becomes several micron-meters. Accordingly, even the tilt mirror 21A shifts the beams projected on the signal input ports, the deviation between the MMI devices, 32a and 32b, in the optical coupling may be secured within a range of 0.5 dB. The signal light L1 entering the tilt mirror 21A is the collimated beam with the beam diameter of 240 to 260 µm, and the signal light, L12 and L13, split by the BS 26 are also the collimated beams until reaching the lens systems, 28 and 31. The lens systems, 28 and 31, concentrate the signal light, L12 and L13, onto the signal input port of the MMI devices, 32a and 32b, with the field diameters of 2.2 to 2.8 µm, which is comparable to the mode field diameter of the signal input ports of the MMI devices, 32a and 32b, but the deviation between two MMI devices, 32a and 32b, are secured within the range of ±0.5 dB concurrently with the attenuation of 15 dB.

Although the optical module 1D of the present embodiment places the tilt mirror on the optical axis of the signal light L1, that is, on the axis of the signal port 11. However, the optical module 1B, where the optical coupling system thereof is shown in FIG. 14, may replace the mirror 42 with the tilt mirror. In such an arrangement, because distances from the tilt mirror to the signal input ports of the MMI devices, 32a and 32b, become shorter than those of the optical module 1D described above. Accordingly, the deviation between the two MMI devices, 32a and 32b, in the optical coupling may be further compressed. The tilt mirror may be set in any positions between the signal port 11 and the PBS 26.

While particular embodiment of the present invention has been described herein for purposes of illustration, many modifications and changes will become apparent to those skilled in the art. Accordingly, the appended claims are intended to encompass all such modifications and changes as fall within the true spirit and scope of this invention.

The present application claims the benefit of priority of Japanese Patent Applications No. 2015-232076 and No 2015-232138 each filed on Nov. 27, 2015, No. 2016-004615 filed on Jan. 13, 2016, and No. 2016-013528 filed on Jan. 27, 2016; which are incorporated herein by references.

The invention claimed is:

1. A method of assembling an optical module that provides a housing, an input port, and an optical component, the housing having one side and another side, the input port having an axis and being fixed to the one side of the housing, the optical component having an optical surface whose normal makes an angle θ which is different from 0° or 90° against the axis of the optical port, the method comprising steps of:
   placing a tool on a rotation stage with a reference wall, the tool having a pair of sides extending in parallel to each other and a reference side making the angle θ against one of the sides, the too in one of the paired side being abutted against the reference wall of the rotation stage;
   pointing the reference side of the tool toward a preset direction by rotating the rotation stage;
   replacing the tool with the housing as making the another side thereof in contact to the reference wall of the rotation stage;
   aligning the normal of the optical component with the present direction; and
   placing the optical component in a preset position within the housing.

2. The method of claim 1,
   wherein the step of pointing the reference side of the tool, and the step of aligning the normal of the optical component are carried out by using an auto-collimator.

3. The method of claim 1,
   wherein the angle θ is one of 45° and 135°.

4. The method of claim 1,
   wherein the step of placing the optical component is carried out only by visually inspecting the preset position.

5. The method of claim 1,
   wherein the optical module further includes another optical component with an optical surface whose normal makes another angle against the axis of the input port, the another angle and the angle θ being a supplementary angles to each other,
   wherein the method further includes a step of, after the step of installing the optical component,
   adjusting rotation stage for the another optical component by steps of,
      removing the housing from the rotation stage,
      placing the tool on the rotation stage as abutting the another of the pair of the sides against the reference wall of the rotation stage, and
      pointing the reference side of the tool toward the preset direction by rotating the rotation stage, and
   installing the another optical components within the housing as aligning the normal of the another optical component with the preset direction.

6. The method of claim 1,
   wherein the input port is configured to enter signal light therein, and
   wherein the optical module further includes another input port configured to enter local light therein, a multimode interference (MMI) device that interferes the signal light with the local light, and lens systems for optically coupling the input port and the another input port with the MMI device, the method further comprising steps of, installing the MMI device within the housing before the step of installing the optical component, preparing a couple of dummy ports that provide collimating lenses therein, the dummy ports entering test beams within the housing, the test beams being converted into respective collimated beams by the collimating lenses, sliding the dummy ports on the one side of the housing such that the test beams output from the dummy ports optically couple with the MMI device, installing the lens systems within the housing, the lens systems concentrating the test beams onto the MMI device, and replacing the dummy ports with the input port and the another input port such that the signal light output from the input port and the local light output from the another input port optically couple with the MMI device by respective efficiencies substantially same with the couplings by the test beams.

7. The method of claim 6, wherein the optical module further provides a variable optical attenuator (VOA) that attenuates the signal light, and wherein the method further includes a step of, placing the VOA between the input port and the optical components.

8. The method of claim 6, wherein the MMI device has a signal input port and a local input port, the signal input port receiving the signal light coming from the input port, the local input port receiving the local light coming from the another input port, the MMI device having an interval between the signal input port and the local input port smaller than an interval between the input port and the another input port, wherein the optical component includes a mirror and a beam splitter (BS) each set on an optical path from the input port to the signal input port of the MMI device, and wherein the mirror and the BS matches an interval between the signal light and the local light at the input port and the another input port with the interval between the signal input port and the local input port of the MMI device by translating an optical axis of the signal light.

9. The method of claim 6, wherein the optical module further includes another MMI device, a polarization beam splitter (PBS), another BS, and a half-wavelength ($\lambda/2$) plate, the PBS and the another BS configuring a first group having surfaces whose normals make the angle $\theta$ against the axis of the input port, the BS and the mirror configuring a second group having surfaces whose normals make another angle supplemental to the angle $\theta$, and the $\lambda/2$ plate configuring a third group with a surface whose normal is parallel to the axis, wherein the step of placing the optical component includes a step of placing the PBS and the another BS in the first group of the optical components in respective preset positions only by visually inspecting respective preset positions for the PBS and the another BS, and wherein the method further includes subsequent steps of, adjusting rotation stage for the by steps of, removing the housing from the rotation stage, placing the tool on the rotation stage as abutting the another of the pair of the sides against the reference wall of the rotation stage, and pointing the reference side of the tool toward the preset direction by rotating the rotation stage, aligning the normal of the BS and the mirror in the second group of the optical components with the preset direction, and placing the BS and the mirror in the second group of the optical components in respective preset positions only by visually inspecting respective preset positions for the BS and the mirror.

* * * * *